United States Patent
Hara et al.

(10) Patent No.: US 10,457,371 B2
(45) Date of Patent: Oct. 29, 2019

(54) VESSEL STEERING APPARATUS

(71) Applicant: YANMAR CO., LTD., Osaka-shi, Osaka (JP)

(72) Inventors: Naohiro Hara, Osaka (JP); Hiroaki Wakahara, Osaka (JP); Jun Watanabe, Osaka (JP); Gakuji Tamura, Osaka (JP)

(73) Assignee: YANMAR CO., LTD., Osaka (JP)

( * ) Notice: Subject to any disclaimer, the term of this patent is extended or adjusted under 35 U.S.C. 154(b) by 263 days.

(21) Appl. No.: 15/520,625

(22) PCT Filed: Aug. 24, 2015

(86) PCT No.: PCT/JP2015/073666
§ 371 (c)(1),
(2) Date: Jul. 24, 2017

(87) PCT Pub. No.: WO2016/063610
PCT Pub. Date: Apr. 28, 2016

(65) Prior Publication Data
US 2017/0349257 A1 Dec. 7, 2017

(30) Foreign Application Priority Data

Oct. 23, 2014 (JP) ................................. 2014-216750
Oct. 23, 2014 (JP) ................................. 2014-216751

(51) Int. Cl.
B63H 21/21 (2006.01)
B63H 25/02 (2006.01)
(Continued)

(52) U.S. Cl.
CPC ............ B63H 21/21 (2013.01); B63B 49/00 (2013.01); B63H 25/02 (2013.01); B63H 25/04 (2013.01);
(Continued)

(58) Field of Classification Search
None
See application file for complete search history.

(56) References Cited

U.S. PATENT DOCUMENTS

| 8,924,054 B1* | 12/2014 | Arbuckle | ............... B63H 21/21 701/21 |
| 9,616,978 B2* | 4/2017 | Kojima | ................... B63B 49/00 |
| 2015/0089427 A1* | 3/2015 | Akuzawa | ............. G05D 1/0206 715/771 |

FOREIGN PATENT DOCUMENTS

| JP | H07101397 A | 4/1995 |
| JP | H07223591 A | 8/1995 |

(Continued)

OTHER PUBLICATIONS

International Search Report corresponding to Application No. PCT/JP2015/073666; dated Oct. 20, 2015.

*Primary Examiner* — Lail A Kleinman
(74) *Attorney, Agent, or Firm* — Norton Rose Fulbright US LLP

(57) ABSTRACT

For a vessel steering apparatus for performing a movement control to move a vessel to a target position on the basis of a signal of a GPS apparatus, a movement control stop area, a buffer area adjacent to the movement control stop area, and a movement-controlling area adjacent to the buffer area are set on the basis of the distance from the target position, wherein in the movement control stop area, thrust generation by a propulsion apparatus is stopped; in the movement-controlling area, thrust is generated by the propulsion apparatus; and in the buffer area, thrust is generated by the propulsion apparatus of the vessel for movement control only in the case where the vessel moves from the movement-controlling area to the buffer area, then stays in the buffer area, and moves in a direction away from the target position.

16 Claims, 16 Drawing Sheets

(51) Int. Cl.
*B63H 25/42* (2006.01)
*B63H 25/04* (2006.01)
*B63B 49/00* (2006.01)
*G05D 1/02* (2006.01)
*B63J 99/00* (2009.01)

(52) U.S. Cl.
CPC ........... B63H 25/42 (2013.01); G05D 1/0206 (2013.01); *B63B 2721/00* (2013.01); *B63H 2025/026* (2013.01); *B63H 2025/045* (2013.01); *B63J 2099/008* (2013.01)

(56) References Cited

FOREIGN PATENT DOCUMENTS

| | | |
|---|---|---|
| JP | H1129095 A | 2/1999 |
| JP | H1134973 A | 2/1999 |
| JP | 2003112691 A | 4/2003 |
| JP | 2008222082 A | 9/2008 |
| JP | 2008247102 A | 10/2008 |
| JP | 2009241738 A | 10/2009 |

\* cited by examiner

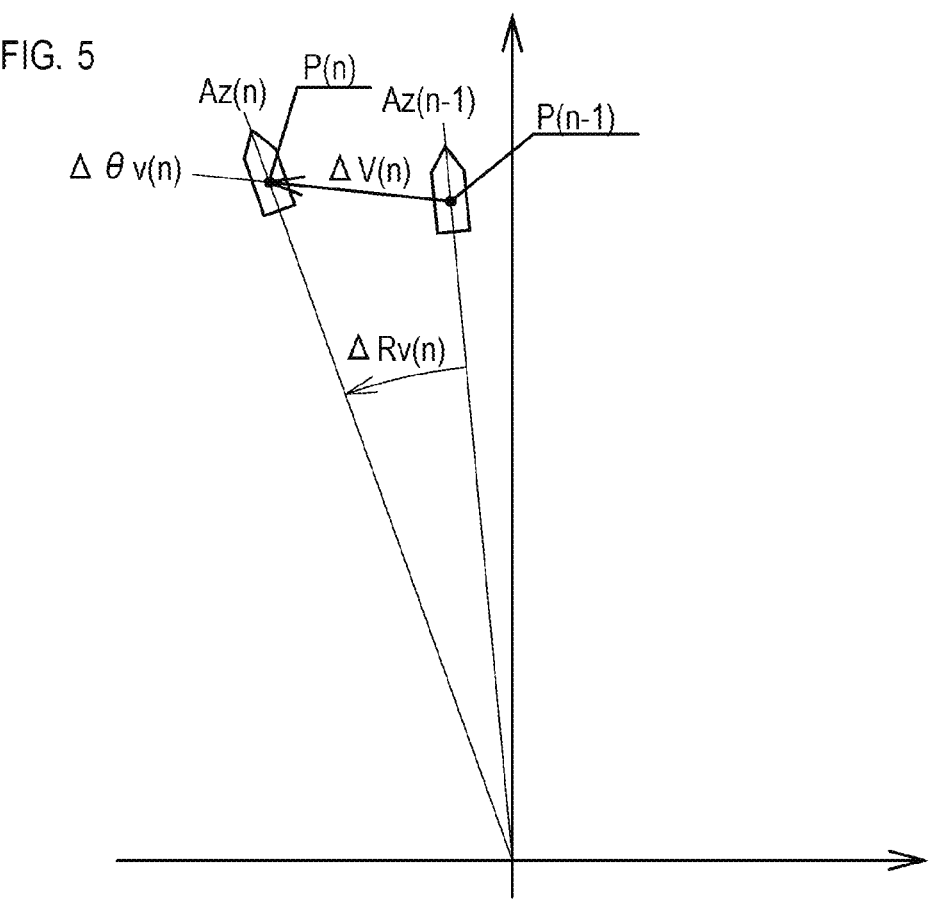

VESSEL STEERING APPARATUS

CROSS REFERENCE TO RELATED APPLICATIONS

This is the U.S. national stage of application No. PCT/JP2015/73666, filed on Aug. 24, 2015. Priority under 35 U.S.C. § 119(a) and 35 U.S.C. § 365(b) is claimed from Japanese Application No. 2014-216750, filed on Oct. 23, 2014, and Japanese Application No. 2014-216751, filed on Oct. 23, 2014, the disclosures of which are also incorporated herein by reference.

TECHNICAL FIELD

The present invention relates to a ship steering device.

BACKGROUND ART

Conventionally, a ship (inboard boat) in which power is transmitted from a prime motor (engine) provided inside a hull to a forward-backward propeller provided outside the hull through a switching clutch and a propeller shaft has been known. A ship with a side thruster for a lateral movement in a rightward or leftward direction to improve the maneuverability at the time of landing or the like has also been known. The side thruster is formed of a propeller provided near the lateral center on the bow side to produce thrust in the left-and-right direction. The side thruster enables a ship to move in the left-and-right direction, thereby facilitating a landing operation.

When positioning the hull of a ship having the above configuration, it is necessary to steer the ship in consideration of mutual influence between the side thruster and the forward-backward propeller, and thus a steering operation of the ship is complicated. In view of this, a ship in which the side thruster and the forward-backward propeller are controlled in conjunction with each other by using a joystick lever to facilitate the steering operation has been known. See Patent Document 1, for example.

When the ship according to Patent Document 1 is to be positioned at a target position designated by using a GPS device and a heading sensor, the hull of the ship cannot be settled at the target position due to water current, wind, and the like, or an inertial force (way of the ship), thereby causing in frequent on and off operations of a driving device. In addition, in the case where a dead zone is provided around the target position to give flexibility in determining the position of the ship, the ship may be drifted by wind or water current and positioned on a boundary of the dead zone.

PRIOR ART DOCUMENTS

Patent Documents

Patent Document 1: JP-A 2008-222082 Gazette

SUMMARY OF THE INVENTION

Problems to be Solved by the Invention

The present invention has been made in view of the above problems, and an object thereof is to provide a ship steering device capable of performing a positioning control corresponding to the influence of an inertial force of a ship and disturbances.

Solutions to the Problems

The problems to be solved by the present invention are as described above, and now solutions to the problems are described below.

According to one aspect of the present invention, there is provided a ship steering device configured to perform a movement control to move a ship to a target position based on a signal from a GPS device. In the ship steering device, a movement control suspension zone including the target position, a buffer zone adjacent to the movement control suspension zone, and a movement control execution zone adjacent to the buffer zone are set based on a distance between a present position calculated from the signal from the GPS device and the target position, generation of a thrust by a propulsion apparatus of the ship for a movement control is suspended in the movement control suspension zone, the thrust by the propulsion apparatus of the ship for the movement control is generated in the movement control execution zone, and the thrust is generated by the propulsion apparatus of the ship for the movement control in the buffer zone only when the ship stays in the buffer zone after being moved from the movement control execution zone to the buffer zone, and when the ship is moving away from the target position.

According to another aspect of the present invention, there is provided a ship steering device configured to perform a turning control to turn a ship in a target bearing based on a signal from a bearing sensor. In the ship steering device, a turning control suspension zone including the target bearing, a buffer zone adjacent to the turning control suspension zone, and a turning control execution zone adjacent to the buffer zone are set based on an angle difference between a present bearing calculated from the signal from the bearing sensor and the target bearing, generation of a thrust by a propulsion apparatus of the ship for the turning control is suspended in the turning control suspension zone, the thrust by the propulsion apparatus of the ship for the turning control is generated in the turning control execution zone, and the thrust by the propulsion apparatus of the ship for the turning control is generated in the buffer zone only when the ship stays in the buffer zone after turning from the turning control execution zone to the buffer zone, and when the ship is turning away from the target bearing.

According to the present invention, a size of the buffer zone is changed according to characteristics of the ship.

Effects of the Invention

The present invention provides the effects as described below.

According to the present invention, a control mode is set corresponding to behavior of a ship in each zone to shift the control mode in consideration of existence of the influence of the way of the ship and disturbances such as water current or wind. This makes it possible to provide a positioning control corresponding to the influence of an inertial force of the ship or the disturbances.

Next, other problems to be solved by the present invention are described.

When positioning the hull of a ship, it is necessary to steer the ship in consideration of mutual influence between the side thruster and the forward-backward propeller, and thus the steering of the ship is complicated. In view of this, a ship that controls a side thruster and a forward-backward propeller in conjunction with each other by using a joystick lever to facilitate the steering operation has been known. See Patent Document 1, for example.

The ship according to Patent Document 1 can be steered while allowing propulsive devices to be easily controlled in conjunction with each other by using the joystick lever. In other words, the ship can simultaneously perform a movement control for changing the position of the ship and a turning control for changing the bearing of the ship without awareness of an operator. However, the technique described in the Patent Document lacks consideration of influence of the turning control during the movement control. Accordingly, when the ship is to be positioned at target coordinates in a target bearing, a correction by the operator is required so that the ship reaches the target coordinates in the target bearing, since the path of the ship bulges in the turning direction without moving in a straight line due to the influence of the turning control.

To solve the above problems, an object of the present invention is to provide a ship steering device capable of moving the ship in a straight line even when the ship makes a turn while moving, and also capable of keeping the ship at the target coordinates in the target bearing.

The solutions to the problems are described below.

The ship steering device performs a movement control to move the ship to the target coordinates and performs a turning control to turn the ship in the target bearing based on a signal from a GPS device and a signal from a bearing sensor. When the ship is turned in the target bearing while being moved in a target moving direction, the ship steering device calculates the present coordinates and bearing after a unit time in the case where the ship is turned from the present coordinates and bearing, and the present coordinates and bearing after the unit time in the case where the ship is not turned from the present coordinates and bearing, and corrects the target moving direction, in which the ship is moved, based on a difference between the present coordinates and bearing in the case of turning the ship and the present coordinates and bearing in the case of not turning the ship.

A movement control suspension zone including the target position, a buffer zone adjacent to the movement control suspension zone, and a movement control execution zone adjacent to the buffer zone are set based on a distance between a present position calculated from the signal from the GPS device and the target position, generation of a thrust by a propulsion apparatus of the ship for a movement control is suspended in the movement control suspension zone, the thrust by the propulsion apparatus of the ship for the movement control is generated in the movement control execution zone, and the thrust is generated by the propulsion apparatus of the ship for the movement control in the buffer zone only when the ship stays in the buffer zone after being moved from the movement control execution zone to the buffer zone, and when the ship is moving away from the target position.

A turning control suspension zone including the target bearing, a buffer zone adjacent to the turning control suspension zone, and a turning control execution zone adjacent to the buffer zone are set based on an angle difference between a present bearing calculated from the signal from the bearing sensor and the target bearing, generation of a thrust by a propulsion apparatus of the ship for the turning control is suspended in the turning control suspension zone, the thrust by the propulsion apparatus of the ship for the turning control is generated in the turning control execution zone, and the thrust by the propulsion apparatus of the ship for the turning control is generated in the buffer zone only when the ship stays in the buffer zone after turning from the turning control execution zone to the buffer zone, and when the ship is turning away from the target bearing.

The effects of the solutions to the problems are described below.

The present coordinates after the unit time in which the target moving direction shifted by a turn of the ship is corrected are calculated for every unit time. This enables the ship to move in a straight line even when the ship makes a turn while moving.

In addition, the movement of the ship caused by the movement control and the turning control does not affect the stopping accuracy at the target coordinates and in the target bearing. This configuration enables the ship to move in a straight line even when the ship makes a turn while moving and stay at the target coordinates in the target bearing.

BRIEF DESCRIPTION OF THE DRAWINGS

FIG. 5 is a view illustrating a moving speed, a moving direction, and a turning speed when the ship moves and turns.

FIG. 8B-1 is a view illustrating a movement of the ship in a buffer zone at the time of the turning control, FIG. 8B-2 is a view illustrating a movement of the ship under a predetermined condition in the buffer zone at the time of the turning control.

FIG. 11B-1 is a view illustrating a movement of the ship in the buffer zone at the time of the movement control, FIG. 11B-2 is a view illustrating a movement of the ship under a predetermined condition in the buffer zone at the time of the movement control.

EMBODIMENTS OF THE INVENTION

Figure 1:
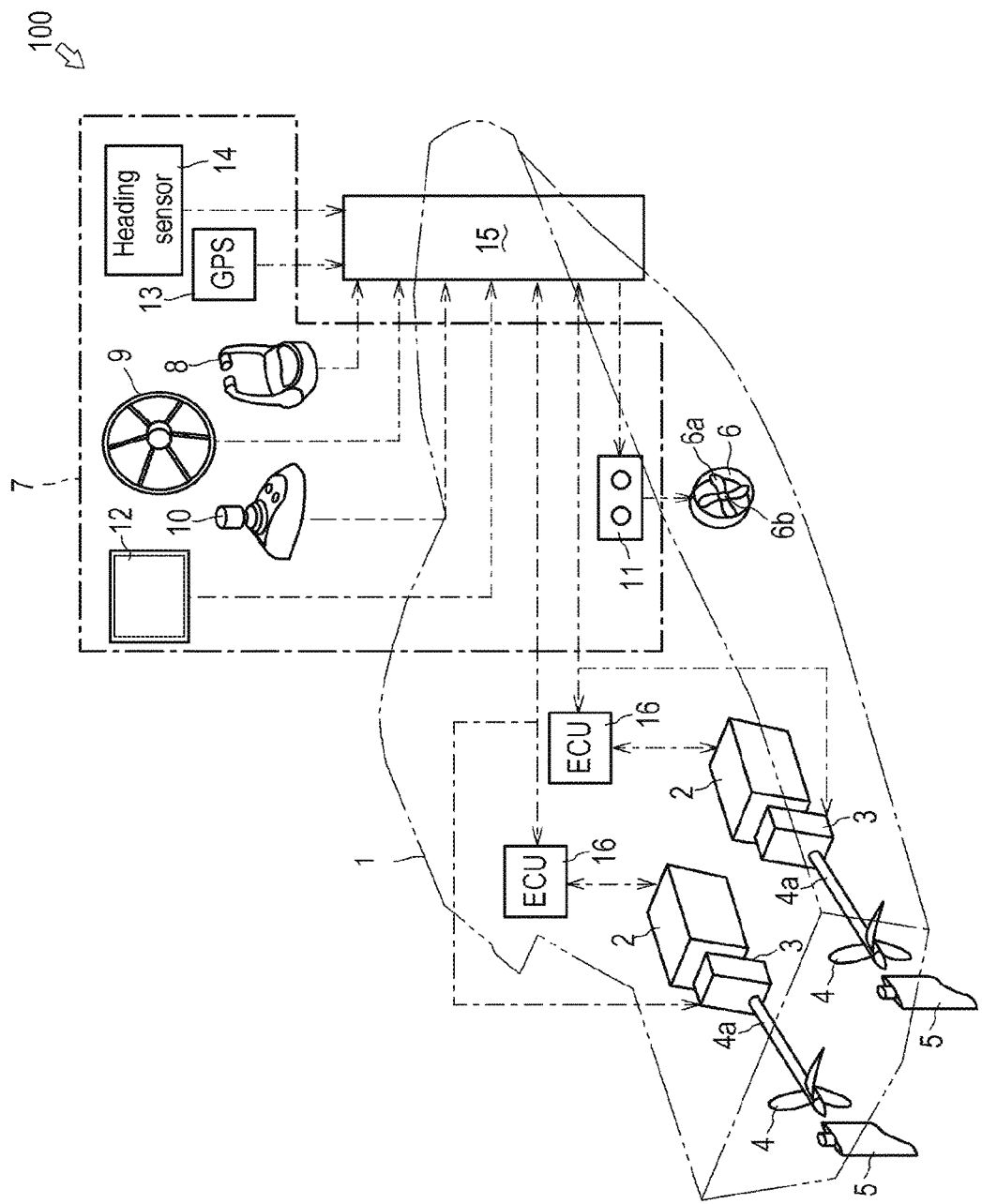
FIG. 1 is a schematic view of an overall outline of a ship with a ship steering device according to the present invention.

An overall outline and configuration of a ship 100, which is one embodiment of the present invention, are described with reference to FIGS. 1 to 3. Note that the ship 100 in FIG. 1 is a ship with the so-called two-axis propulsion system (inboard boat). However, the number of the propulsion axes and the form of the propulsive devices are not limited thereto, and the ship may have a plurality of axes or have an out-drive system. In this embodiment, the direction of the bow of the ship 100 is defined as the fore side, and the fore-and-aft direction and the left-and-right direction are defined accordingly.

Figure 2:
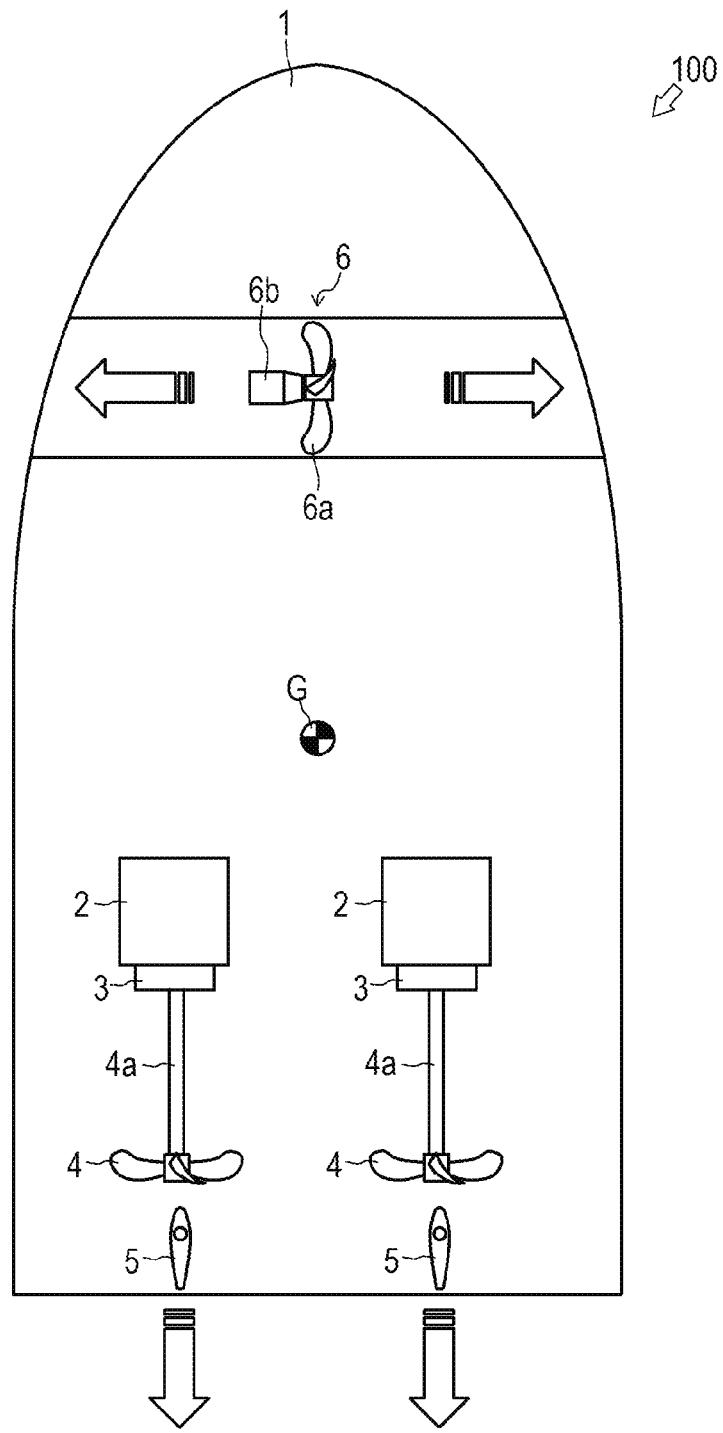
FIG. 2 is a schematic plan view showing a layout of a side thruster and forward-backward propellers of the ship with the ship steering device according to the present invention.

Referring to FIGS. 1 and 2, the ship 100 is an inboard boat in which power from engines 2 is transmitted to forward-backward propellers 4 through propeller shafts 4a, respectively. The hull 1 of the ship 100 includes propulsion apparatuses including the engines 2, switching clutches 3, the forward-backward propellers 4, rudders 5, a side thruster 6, and ECUs 16, and also includes a ship steering device 7 having an accelerator lever 8, a steering wheel 9, a joystick lever 10, a side thruster controller 11, a monitor 12, a GPS device 13, a heading sensor (bearing sensor) 14, and a ship steering control device 15. Note that the ship 100 is an inboard boat having the propulsion apparatuses on the port side and the starboard side in this embodiment, but is not limited thereto, and the ship 100 may be a sterndrive boat or the like.

The two engines 2 respectively generate power to rotate the forward-backward propellers 4 on the port and starboard sides. The engines 2 are respectively disposed at the port side and the starboard side of the hull 1. The output axes of the engines 2 are respectively connected to the switching clutches 3.

The two switching clutches 3 switch and output the power transmitted from the output axes of the engines 2 between the normal rotation direction and the reverse rotation direction. The input sides of the switching clutches 3 are connected to the output axes of the engines 2, respectively. The output sides of the switching clutches 3 are connected to the propeller shafts 4a, respectively. In other words, the switching clutches 3 are configured to transmit the power from the engines 2 to the propeller shafts 4a, respectively.

The two forward-backward propellers 4 are configured to produce thrust in the fore-and-aft direction. The forward-backward propellers 4 are respectively connected to the two propeller shafts 4a that penetrate the bottom of the port side and the bottom of the starboard side of the hull 1 to reach the outside of the ship. The forward-backward propellers 4 are respectively rotated by the power from the engines 2 transmitted through the respective propeller shafts 4a. Each of the forward-backward propellers 4 produces thrust by allowing a plurality of blades arranged around a rotation shaft thereof to stir the surrounding water.

The two rudders 5 are configured to change the direction of the water current generated by the rotation of the forward-backward propellers 4. The rudders 5 are disposed behind the forward-backward propellers 4 respectively, with one at the rear end (the stern side) of the bottom of the hull on the port side and the other at the rear end (the stern side) of the bottom of the hull on the starboard side. The rudders 5 are configured to rotate in a predetermined range of angles in the left-and-right direction around the rotation shaft provided on the hull 1. The rudders 5 are connected and interlocked with the steering wheel 9. With this configuration, when the rear ends of the rudders 5 are turned to the right side of the hull 1 by an operation of the steering wheel 9, the stern of the ship 100 is pushed leftward by the thrust produced by the water current, thereby turning the bow side rightward. In the same manner, when the rear ends of the rudders 5 are turned to the left side of the ship 100 by an operation of the steering wheel 9, the stern of the ship 100 is pushed rightward by the thrust produced by the water current, thereby turning the bow side leftward.

The side thruster 6 is configured to produce thrust in the left-and-right direction. The side thruster 6 is provided at the lateral center on the bow side of the hull 1. The side thruster 6 includes a propeller 6a and a motor 6b. The motor 6b is connected to the side thruster controller 11, and is rotatable at an arbitrary speed. The side thruster 6 is configured in such a manner that a direction of the thrust produced by the propeller 6a coincides with the left-and-right direction of the hull 1. The side thruster 6 produces the thrust having an arbitrary magnitude in the left-and-right direction by driving the motor 6b based on a signal from the side thruster controller 11 to rotate the propeller 6a.

The accelerator lever 8 included in the ship steering device 7 is configured to generate signals on the rotation speed of one of the forward-backward propellers 4 on the port side, the rotation speed of the other one of the forward-backward propellers 4 on the starboard side, and the rotation direction of the forward-backward propellers 4. The accelerator lever 8 includes a lever corresponding to one of the forward-backward propellers 4 on the port side and a lever corresponding to the other one of the forward-backward propellers 4 on the starboard side. In other words, the accelerator lever 8 is configured to generate individual signals for the forward-backward propellers 4 on the port side and on the starboard side. The accelerator lever 8 is configured to incline in the fore-and-aft direction of the ship 100 at an arbitrary angle. According to the inclination direction and the inclination amount thereof, the accelerator lever 8 is configured to generate individual signals on clutching states of the switching clutches 3 corresponding to the rotation speeds of the engines 2. When inclined forward, the accelerator ever 2 generates the signals for the forward-backward propellers 4 to produce the thrust to move the ship 100 forward, and when inclined backward, the accelerator lever 8 generates the signals for the forward-backward propellers 4 to produce the thrust to move the ship 100 backward.

The steering wheel 9 included in the ship steering device 7 is configured to change the rotation angles of the rudders 5. The steering wheel 9 is connected and interlocked with the rudders 5 on the port side and the starboard side through a wired link mechanism or a hydraulic circuit. When the steering wheel 9 is turned rightward, the rear ends of the rudders 5 are turned rightward. As a result, the water current generated by the forward-backward propellers 4 flows rightward to push the stern of the ship 100 leftward, thereby causing the bow side to be turned rightward. In the same manner, when the steering wheel 9 is turned leftward, the rear ends of the rudders 5 are turned leftward. As a result, the water current generated by the forward-backward propellers 4 flows leftward to push the stern of the ship 100 rightward, thereby causing the bow side to be turned leftward.

Figure 3:
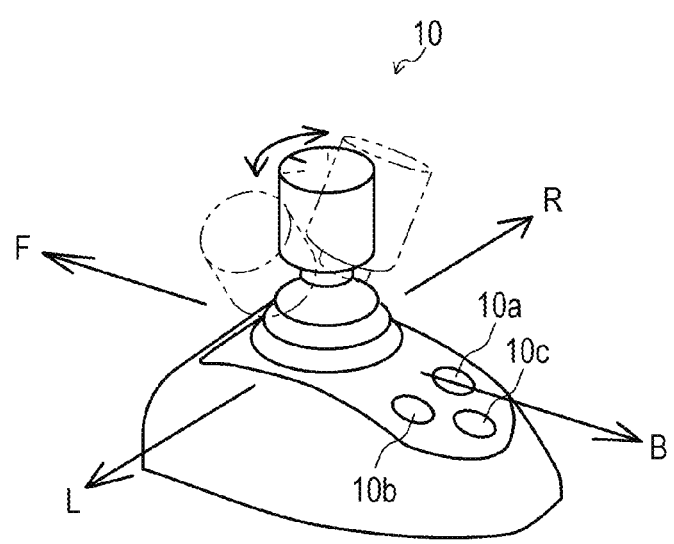
FIG. 3 is a perspective view showing a configuration of a joystick lever of the ship steering device according to the present invention.

Referring to FIGS. 1 and 3, the joystick lever 10 included in the ship steering device 7 is configured to generate a signal to move the ship 100 in an arbitrary direction. The joystick lever 10 is configured to incline in an arbitrary direction at an arbitrary angle. The joystick lever 10 is configured in a rotatable manner around a lever axis at an arbitrary angle. According to the operation state and operation amount thereof, the joystick lever 10 is configured to generate signals on the rotation speeds of the engines 2 and the switching states of the switching clutches 3, and a signal on the rotation speed and the rotation direction of the side thruster 6. Specifically, when operated to incline in an arbitrary direction, the joystick lever 10 generates signals on the forward-backward propellers 4 on the port and starboard sides and the side thruster 6 to move the ship 100 in the operation direction with the thrust corresponding to the operation amount. When operated to rotate around the lever axis, the joystick lever 10 generates signals on the forward-backward propellers 4 on the port and starboard sides and the side thruster 6 to turn the ship 100 in an arbitrary direction with the thrust corresponding to the operation amount.

The joystick lever 10 includes a positioning switch 10*a* configured to set target coordinates for a positioning control (described later), a movement switch 10*b* configured to start to move the ship 100 toward the target coordinates, and a change switch 10*c* configured to change various settings. The positioning switch 10*a* generates a positioning control start signal. The movement switch 10*b* generates a movement signal for starting the movement of the ship 100 toward the target coordinates set by the operation of the joystick lever 10. The change switch 10*c* generates a signal to change control conditions for positioning the ship 100.

The side thruster controller 11 included in the ship steering device 7 is configured to control the side thruster 6. When turned on, the side thruster controller 11 rotates the motor 6*b* of the side thruster 6 in an arbitrary rotation direction so that the propeller 6*a* of the side thruster 6 produces the thrust in the left-and-right direction.

The Global Positioning System (GPS) device 13 included in the ship steering device 7 is configured to measure (calculate) the position coordinates of the ship 100. The GPS device 13 is configured to receive signals form a plurality of GPS satellites to calculate the position coordinates of the ship 100, and is configured to output the present position in the form of latitude La(n) and longitude Lo(n). In other words, the GPS device 13 calculates absolute values of the position coordinates of the ship 100.

The heading sensor 14 included in the ship steering device 7, which is a bearing sensor, is configured to measure (calculate) the direction of the bearing of the ship 100. The heading sensor 14 is configured to calculate the bearing of the bow of the ship 100 based on the geomagnetism. In other words, the heading sensor 14 is configured to calculate an absolute bearing of the bow of the ship 100.

Referring to FIG. 1, the ECUs 16 are configured to control the engines 2. The ECUs 16 store various programs and data to control the engines 2. The ECUs 16 are provided for the engines 2 respectively. Each of the ECUs 16 may be configured by connecting a CPU, a ROM, a RAM, an HDD, and the like to each other through a bus, or may be configured by a single chip LSI or the like.

Each of the ECU 16 is connected to a fuel regulating valve, a fuel injection valve, various sensors, and the like of a fuel supply pump (not shown) of a corresponding one of the engines 2, and is capable of controlling the supplying amount of the fuel regulating valve and opening/closing of the fuel injection valve, and also capable of acquiring information detected by the sensors.

The ship steering control device 15 included in the ship steering device 7 is configured to control the engines 2, the switching clutches 3, and the side thruster 6 based on the detection signal from the accelerator lever 8, the steering wheel 9, the joystick lever 10, and the like. Note that the ship steering control device 15 may be configured to perform the so-called automatic navigation, i.e., to calculate a route from its own position and a set target position based on the information from the GPS device 13 and automatically steer the ship.

The ship steering control device 15 stores various programs and data to control the engines 2, the switching clutches 3, and the side thruster 6. The ship steering control device 15 may be configured by connecting a CPU, a ROM, a RAM, an HDD, and the like to each other through a bus, or may be configured by a single chip LSI or the like.

The ship steering control device 15 is connected to the switching clutches 3 and the ECUs 16 for the respective engines 2, and is capable of acquiring the state of each of the switching clutches 3, the operation state of each of the engines 2, and the rotation speed N of the engines and various signals that the ECUs 16 acquire from the various sensors.

The ship steering control device 15 is capable of transmitting a signal for changing (shifting) the state of the clutches to each of the switching clutches 3.

The ship steering control device 15 is capable of transmitting a signal for controlling the fuel regulating valve and the fuel injection valve of the fuel supply pump, and other various devices of each of the engines 2, to corresponding one of the ECUs 16.

The ship steering control device 15 is connected to the accelerator lever 8 and the joystick lever 10, and is capable of acquiring a signal from each of the accelerator lever 8 and the joystick lever 10.

The ship steering control device 15 is connected to the side thruster controller 11 of the side thruster 6, and is capable of transmitting a signal to control the side thruster 6.

The ship steering control device 15 is connected to the GPS device 13 and the heading sensor 14, and is capable of acquiring the absolute coordinates and the absolute bearing of the ship 100.

The ship steering control device 15 is connected to the monitor 12, and is capable of displaying the present position of the ship 100 and the steering state by the joystick lever 10.

The positioning control (control of the position) by the ship steering control device 15 of the ship 100, which is one embodiment of the ship according to the present invention, is described below with reference to FIGS. 4A, 4B, and 5. The positioning control is to move the ship 100 to a desired coordinate position with the bow thereof being directed in a desired bearing and to hold the ship at the position.

Figure 4A:
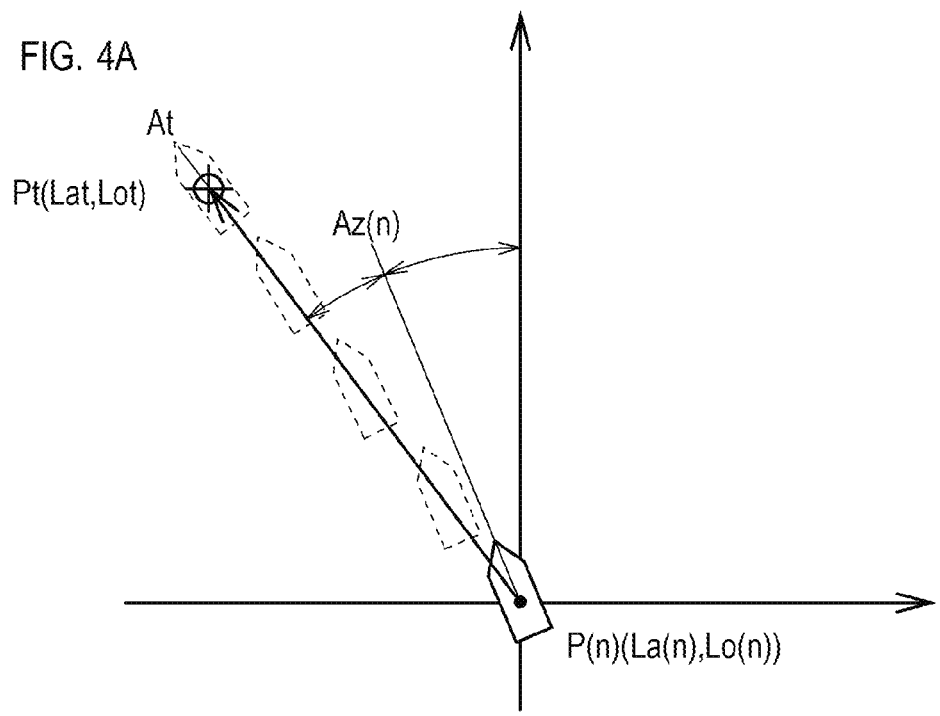
FIG. 4A is a view illustrating a relationship between the present coordinates and the present bearing and target coordinates and a target bearing of the ship.

Referring to FIG. 4A, the ship steering control device 15 starts the positioning control when the positioning switch 10a of the joystick lever 10 is operated. The ship steering control device 15 acquires the present coordinates P(n) of latitude La(n) and longitude Lo(n) which is the present position coordinates of the ship 100 calculated by the GPS device 13, and also acquires a present bearing Az(n) which is the present bearing of the bow of the ship 100 calculated by the heading sensor 14. The ship steering control device 15 calculates target coordinates Pt of latitude Lat and longitude Lot which are target position coordinates of the ship 100 based on the signal corresponding to the operation direction and the operation amount acquired by the joystick lever 10, and calculates a target bearing At which is a direction of the bow of the ship 100 at the target coordinates Pt.

Figure 4B:
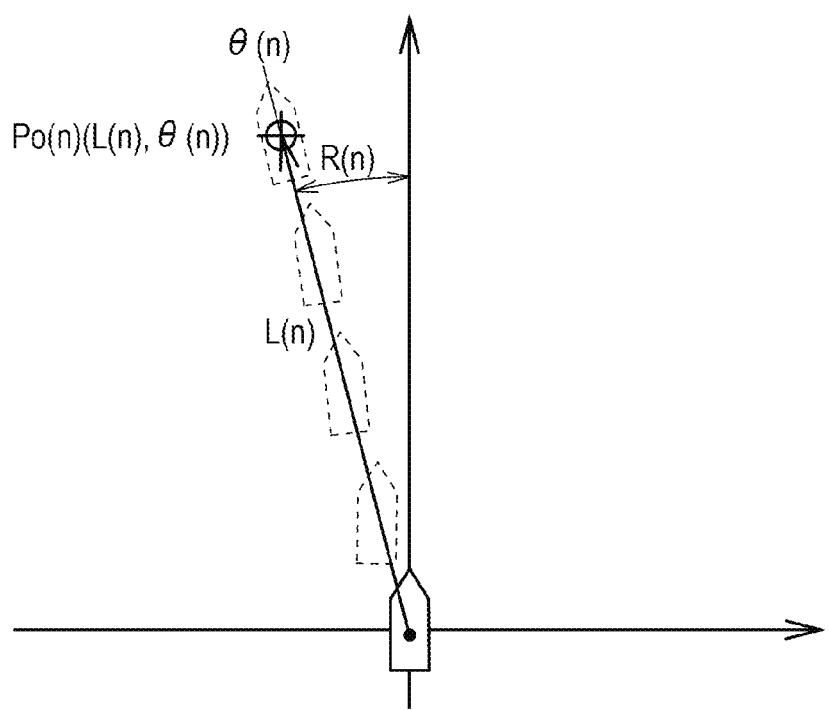
FIG. 4B is a view showing the target coordinates and the target bearing as polar coordinates with reference to the present coordinates and the present bearing of the ship.

Referring to FIG. 4B, the ship steering control device 15 calculates a difference between the present coordinates P(n) and the target coordinates Pt, and converts the target coordinates Pt to target polar coordinates Po(n) represented by a distance L(n) from the present coordinates P(n) and a moving direction θ(n). In addition, the ship steering control device 15 calculates a turning angle R(n) which is an angle difference between the present bearing Az(n) and the target bearing At.

Referring to FIG. 5, the ship steering control device 15 calculates a present turning speed ΔRv(n) which is the turning speed of the ship 100 based on a difference between the present bearing Az(n) and the bearing Az(n−1) before a unit time. The ship steering control device 15 calculates the present speed ΔV(n) and the present direction Δθv(n) based on the coordinates P(n−1) before the unit time, and the present coordinates P(n).

Based on the above calculated values, the ship steering control device 15 calculates a target turning amount Rt(n) of the ship 100 in consideration of the present turning speed ΔRv(n) of the ship 100 from the turning angle R(n) according to the PID control. The ship steering control device 15 calculates a target moving amount Lt(n) of the ship 100 in consideration of the present speed ΔV(n) of the ship 100 from the distance L(n) according to the PID control. The ship steering control device 15 calculates a target moving direction θt(n) of the ship 100 in which a rotation shift is corrected in consideration of the present direction Δθv(n) of the ship 100 from the moving direction θ(n) according to the PID control.

The ship steering control device 15 performs a turning control to control the thrust of the forward-backward propellers 4 of the ship 100, the switching state of the switching clutches 3, and the thrust and the rotation direction of the rudders 5 and the side thruster 6, based on the calculated target turning amount Rt(n). In addition, the ship steering control device 15 performs a movement control to control the thrust of the forward-backward propellers 4 of the ship 100, the switching state of the switching clutches 3, and the thrust and the rotation directions of the rudders 5 and the side thruster 6, based on the calculated target moving amount Lt(n) and the target moving direction θt(n).

Figure 6:
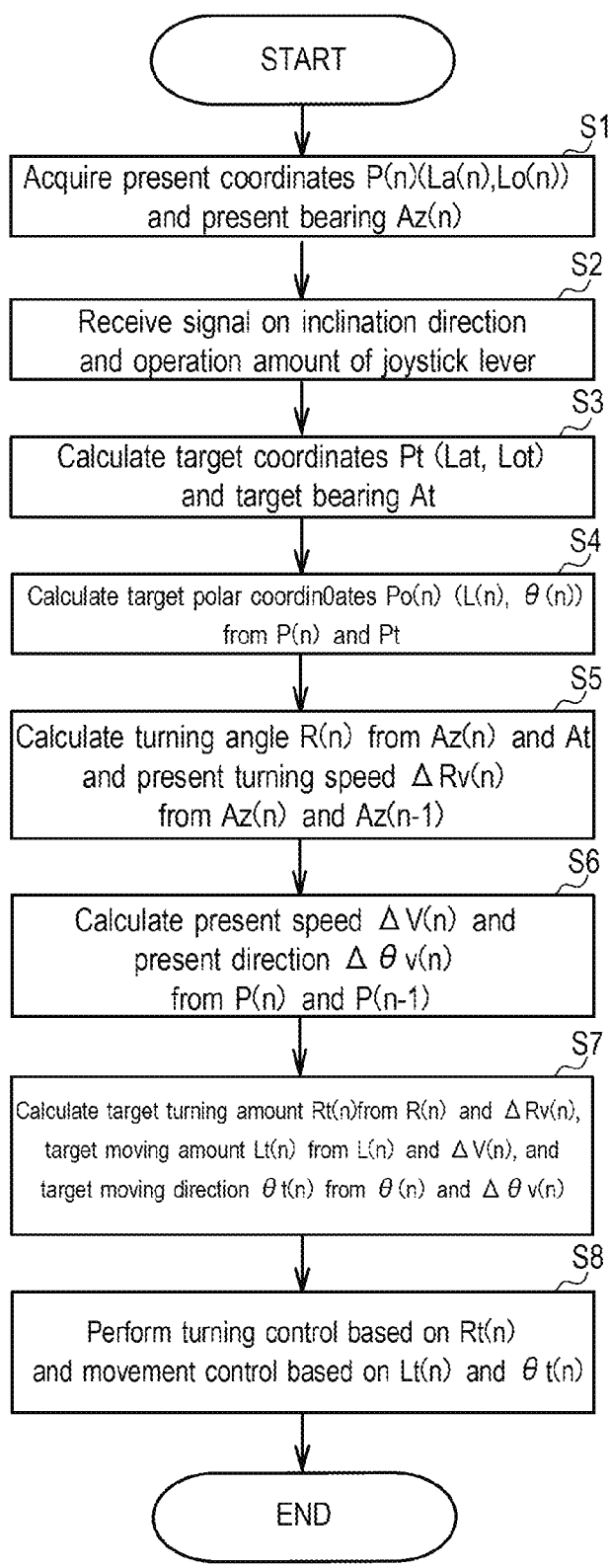
FIG. 6 is a flowchart illustrating a movement control and a turning control of the ship with the ship steering device according to the present invention.

Referring to FIG. 6, the positioning control (control of the position) performed by the ship steering control device 15 in the ship 100, which is one embodiment of the ship according to the present invention, is described in detail below. Note that this embodiment is based on the premise that the positioning switch 10a of the joystick lever 10 has been operated and the ship steering control device 15 has received a positioning control start signal.

In step S1, the ship steering control device 15 acquires from the GPS device 13 the present coordinates P(n) of latitude La(n) and longitude Lo(n), i.e., the present position coordinates of the ship 100, and also acquires from the heading sensor 14 the present bearing Az(n), i.e., the present bearing of the bow of the ship 100, and then, proceeds to the process of step S2.

In step S2, the ship steering control device 15 acquires a signal corresponding to the inclination direction and the operation amount from the joystick lever 10, and then proceeds to the process of step S3.

In step S3, the ship steering control device 15 calculates the target coordinates Pt of latitude Lat and longitude Lot of the target position coordinates of the ship 100 based on the signal acquired from the joystick lever 10, calculates the target bearing At which is the target bearing of the bow of the ship 100, and proceeds to the process of step S4.

In step S4, the ship steering control device 15 calculates a difference between the present coordinates P(n) of the ship 100 and the target coordinates Pt of the ship 100, converts the target coordinates Pt to the target polar coordinates Po(n) represented by the distance L(n) from the present coordinates P(n) and a moving direction θ(n), and proceeds to the process of step S5.

In step S5, the ship steering control device 15 calculates the turning angle R(n) which is a difference between the present bearing Az(n) and a target bearing At, calculates the present turning speed ΔRv(n) from the present bearing Az(n) and the bearing before the unit time Az(n−1), and proceeds to the process of step S6.

In step S6, the ship steering control device 15 calculates the present speed ΔV(n) and the present direction Δθv(n) from the coordinates before the unit time P(n−1) and the present coordinates P(n), and proceeds to the process of step S7.

In step S7, the ship steering control device 15 calculates a target turning amount Rt(n) of the ship 100 per unit time in consideration of the present turning speed ΔRv(n) of the ship 100 from the turning angle R(n) according to the PID control, calculates a target moving amount Lt(n) of the ship 100 per unit time in consideration of the present speed ΔV(n) of the ship 100 from the distance L(n), calculates the target moving direction θt(n) of the ship 100 per unit time in which a deviation due to the turn of the ship is corrected in consideration of the present direction Δθv(n) of the ship 100 from the moving direction θ(n), and proceeds to the process of step S8.

In step S8, the ship steering control device 15 performs the turning control to control the propulsion apparatuses of the ship 100 based on the calculated target turning amount Rt(n), performs a movement control to control the propulsion apparatuses of the ship 100 based on the calculated target moving amount Lt(n) and the target moving direction θt(n), and returns to the process of step S1.

As described above, the ship steering control device 15 converts the target coordinates Pt(0) of the ship 100 to the target polar coordinates Po(n), so that the ship steering device is configured to individually calculates the target turning amount Rt(n), the target moving amount Lt(n), and the target moving direction θt(n). Accordingly, the ship steering device easily controls the thrust of the forward-backward propellers 4, the switching state of the switching clutches 3, and the thrust and the rotation directions of the rudders 5 and the side thruster 6 of the ship 100.

A dead zone and a dead zone control in the positioning control according to the ship steering device of the present invention are described below with reference to FIGS. 7 to 9.

The dead zone in the positioning control refers to a zone in which the positioning control is not performed under a predetermined condition. The dead zone is set in a predetermined area around the target coordinates Pt(0) to perform the positioning control in consideration of the movement due to the inertial force of the ship 100 (so-called a way of the ship) and the effect of water current. The ship steering control device 15 sets the dead zone around the target polar coordinates Po(n) regarding each of the calculated distance L(n) and the turning angle R(n).

First, setting of the dead zone and the dead zone control in the turning control is described. The turning control refers to a control in which the thrust of the forward-backward propellers 4, the switching state of the switching clutches 3, and the thrust and the rotation directions of the rudders 5 and the side thruster 6 are controlled to change the orientation of the bow of the ship 100 by a rotational movement around a predetermined point (for example, the center of mass) of the ship 100 as the center of rotation.

Figure 7:
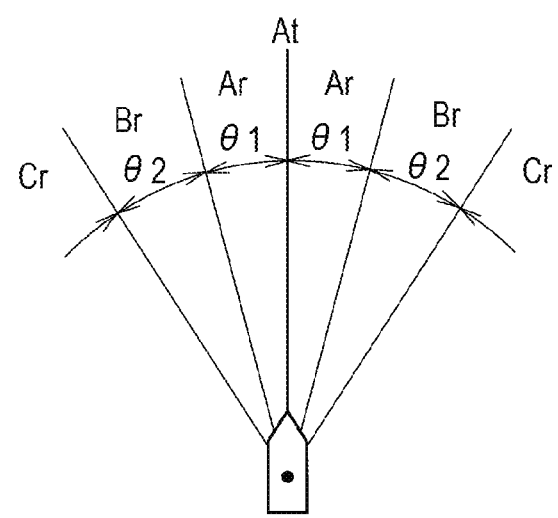
FIG. 7 is a view illustrating a configuration of a dead zone in the turning control of the ship with the ship steering device according to the present invention.

Referring to FIG. 7, the dead zone includes a plurality of zones around the target bearing At which is the target bearing of the bow of the ship 100. The dead zone is set in a predetermined range of angles around the center of rotation of the ship 100. In other words, the dead zone is represented by a range of angles corresponding to the turning angle R(n) that is a difference between the present bearing Az(n) and the target bearing At of the ship 100. In this embodiment, the dead zone includes a turning control suspension zone Ar having a range of angles less than |angle θ1|, a buffer zone Br having a range of angles from ..angle θ1| or more to less than |angle θ2|, and a turning control execution zone Cr having a range of angles of |angle θ2| or more, in a range of ±180° where a rightward direction relative to the target bearing At is defined as plus (+) and the leftward direction relative to the target bearing At is defined as minus (−). Accordingly, the turning control suspension zone Ar and the turning control execution zone Cr are set on each side of the target bearing At in the dead zone with the buffer zone Br being interposed between the turning control suspension zone Ar and the turning control execution zone Cr.

The turning control execution zone Cr refers to a range of angles in which the turning control to turn the ship 100 is performed by the propulsion apparatuses such as the forward-backward propellers 4 and the side thruster 6.

Figure 8A:
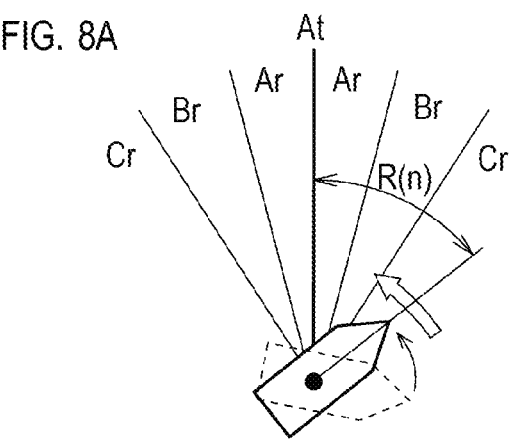
FIG. 8A is a view illustrating a movement of the ship with the ship steering device according to the present invention in a turning control execution zone at the time of the turning control.

Referring to FIG. 8A, the ship steering control device 15 of the ship steering device performs the turning control so as to reduce the turning angle R(n) of the ship 100 according to the PID control when the turning angle R(n) of the ship 100 is included in the turning control execution zone Cr (the white arrow in FIG. 8A).

The buffer zone Br refers to a range of angles in which the turning control to turn the ship 100 by the propulsion apparatuses such as the forward-backward propellers 4 and the side thruster 6 is switched between an execution state and a suspension state corresponding to the operation state at the time when the turning angle R(n) of the ship 100 is included in the buffer zone Br.

Figures 1, 8B:
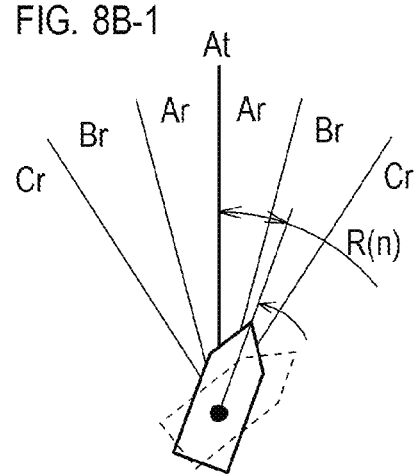
Figures 2, 8B:
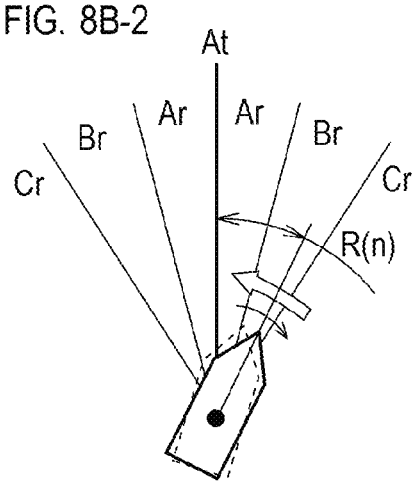

Referring to FIG. 8B-1, the ship steering control device 15 of the ship steering device does not perform the turning control regardless of the turning angle R(n) when the ship 100 is turning in a direction where the turning angle R(n) is reduced in the case where the ship 100 turns from the state in which the turning angle R(n) is included in the turning control execution zone Cr to the state in which the turning angle R(n) is included in the buffer zone Br (see the arrow in FIG. 8B-1) and the turning angle R(n) is still included in the buffer zone Br.

On the other hand, the ship steering control device 15 of the ship steering device performs the turning control so as to reduce the turning angle R(n) (see the white arrow in FIG. 8B-2) when the ship 100 is turning in a direction where the turning angle R(n) is increased (see the arrow in FIG. 8B-2.

Figure 8C:
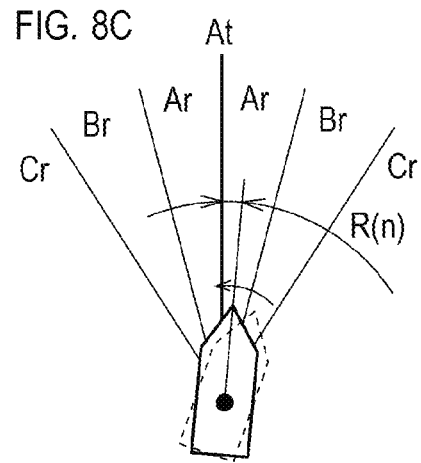
FIG. 8C is a view illustrating a movement of the ship in a turning control suspension zone at the time of the turning control.

Referring to FIG. 8C, the ship steering control device 15 of the ship steering device does not perform the turning control regardless of the rotation direction and the turning angle R(n) in the case where the ship 100 is turning between a state in which the turning angle R(n) is included in the buffer zone Br and the state in which the turning angle R(n) is included in the turning control suspension zone Ar.

The turning control suspension zone Ar refers to a range of distances in which the movement control to move the ship 100 by the propulsion apparatuses such as the forward-backward propellers 4 and the side thruster 6 is not performed.

Referring to FIG. 8C, the ship steering control device 15 of the ship steering device 7 does not perform the turning control regardless of the turning angle R(n) of the ship 100 when the ship 100 makes a turn into a state in which the turning angle R(n) is included in the turning control suspension zone Ar.

In other words, the turning control is suspended when the ship 100 is turning toward the target bearing At and the bow thereof is included in an area determined by the turning control suspension zone Ar or an area determined by the buffer zone Br, and when the ship 100 is turning away from the target bearing At and the bow is included in the area determined by the turning control suspension zone Ar or the bow enters the area determined by the buffer zone Br from the area determined by the turning control suspension zone Ar.

Next, the dead zone control at the time of the turning control by the ship steering device 7 according to the present invention is described in detail below. Note that in this embodiment the ship steering control device 15 has calculated the target bearing At which is a target bearing of the bow of the ship 100 based on a signal corresponding to the operation direction and the operation amount acquired by the joystick lever 10.

Figure 9:
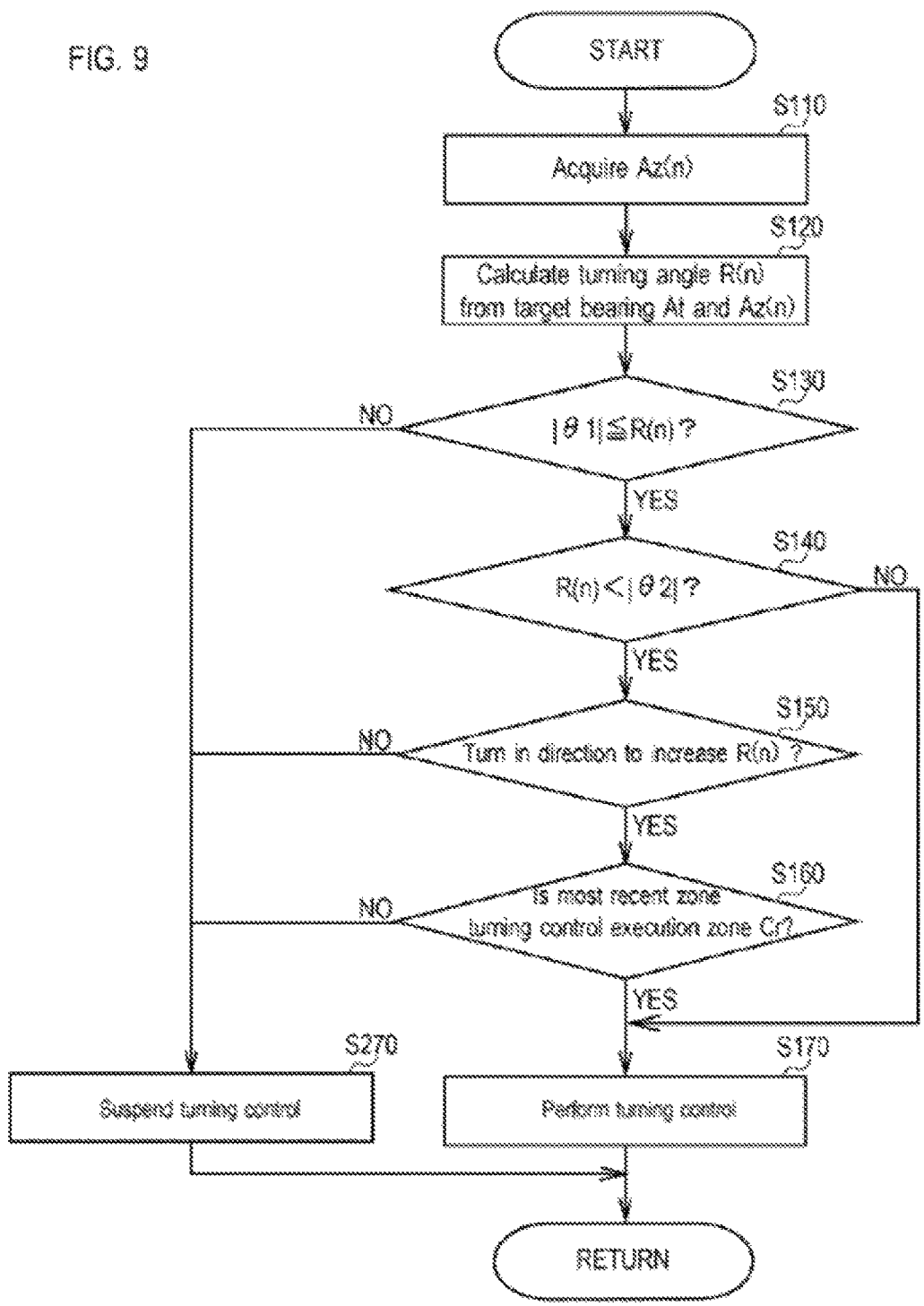
FIG. 9 is a flowchart of a dead zone control in the turning control of the ship with the ship steering device according to the present invention.

Referring to FIG. 9, in step S110, the ship steering control device 15 acquires the present bearing Az(n) of the bow of the ship 100 from the heading sensor 14, and proceeds to the process of step S120.

In step S120, the ship steering control device 15 calculates the turning angle R(n) from the target bearing At calculated in advance and the acquired present bearing Az(n), and proceeds to the process of step S130.

In step S130, the ship steering control device 15 determines whether or not the calculated turning angle R(n) is equal to or greater than |angle θ1|.

As a result, when the calculated turning angle R(n) is determined to be equal to or greater than |angle θ1|, i.e., when the present bearing Az(n) is determined to not be included in the turning control suspension zone Ar, the ship steering control device 15 proceeds to the process of step S140.

On the other hand, the calculated turning angle R(n) is determined to not be equal to or greater than |angle θ1|, i.e., when the present bearing Az(n) is determined to be included in the turning control suspension zone Ar, the ship steering control device 15 proceeds to the process of step S270.

In step S140, the ship steering control device 15 determines whether or not the calculated turning angle R(n) is less than |angle θ2|.

As a result, when the calculated turning angle R(n) is determined to be less than |angel θ2|, i.e., when the present bearing Az(n) is determined to be included in the buffer zone Br, the ship steering control device 15 proceeds to the process of step S150.

On the other hand, when the calculated turning angle R(n) is determined to not less than |angle θ2|, i.e., when the present bearing Az(n) is determined to not be included in the buffer zone Br, the ship steering control device 15 proceeds to the process of step S170.

In step S150, the ship steering control device 15 determines whether or not the calculated turning angle R(n) is greater than the turning angle R(n−1) calculated before the unit time. In other words, the ship steering control device 15 determines whether or not the ship 100 is turning away from the target bearing At.

As a result, when the calculated turning angle R(n) is determined to be greater than the turning angle R(n−1) calculated before the unit time, i.e., when the ship 100 is determined to be turning away from the target bearing At, the ship steering control device 15 proceeds to the process of step S160.

On the other hand, when the calculated turning angle R(n) is equal to or less than the turning angle R(n−1) calculated before the unit time, i.e., when the ship 100 is determined to not be turning away from the target bearing At, the ship steering control device 15 proceeds to the process of step S270.

In step S160, the ship steering control device 15 determines whether or not the calculated turning angle R(n) is most recently included in the turning control execution zone Cr.

As a result, when the calculated turning angle R(n) is determined to be most recently included in the turning control execution zone Cr, the ship steering control device 15 proceeds to the process of step S170.

On the other hand, when the calculated turning angle R(n) is determined to not be most recently included in the turning control execution zone Cr, the ship steering control device 15 proceeds to the process of step S270.

In step S170, the ship steering control device 15 performs the turning control, and returns to the process of step S110.

In step S270, the ship steering control device 15 suspends the turning control, and returns to the process of step S110.

Next, referring to FIGS. 10, and 11A to 11C, setting of the dead zone and the dead zone control at the time of the movement control are described. The movement control refers to a control in which the thrust of the forward-backward propellers 4, the switching states of the switching clutches 3, and the thrust and the rotation directions of the rudders 5 and the side thruster 6 are controlled to move the ship 100 to the target coordinates Pt.

Figure 10:
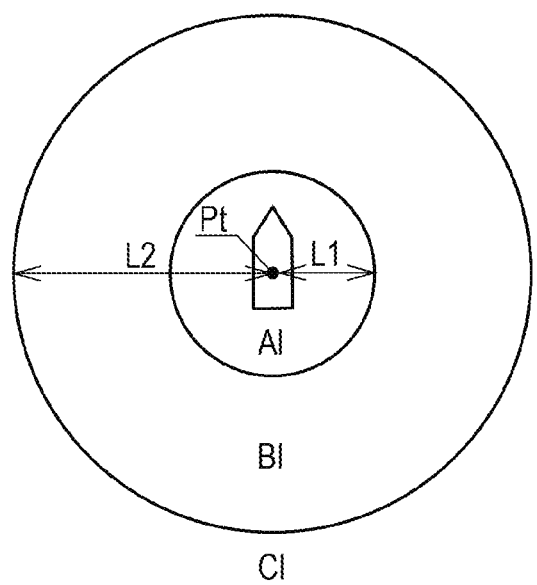
FIG. 10 is a view illustrating a configuration of a dead zone in the movement control of the ship with the ship steering device according to the present invention.

Referring to FIG. 10, the dead zone includes a plurality of zones around the target coordinates Pt that is a target position of the ship 100. The dead zone is set in a predetermined range of distance around the target coordinates Pt of the ship 100. In other words, the dead zone is represented by a range of distance corresponding to the distance L(n) from the present coordinates P(n) to the target coordinates Pt. In this embodiment, the dead zone includes a movement control suspension zone Al which is a zone having a distance from the target coordinates Pt in the range of less than distance L1, a buffer zone B1 which is a zone having distance from the target coordinates Pt in the range of distance L1 or more to less than distance L2, and a movement control execution zone C1 which is a zone having a distance from the target coordinates Pt in the range of distance L2 or more, i.e., a zone excluding the movement control suspension zone Al and the buffer zone B1. Accordingly, the dead zone is set in such a manner that the movement control suspension zone Al and the movement control execution zone C1 are set around the target coordinates Pt with the buffer zone B1 being interposed between the movement control suspension zone Al and the movement control execution zone C1.

The movement control execution zone C1 refers to a range of distance in which a movement control to move the ship 100 by the propulsion apparatuses such as the forward-backward propellers 4 and the side thruster 6 is performed.

Figure 11A:
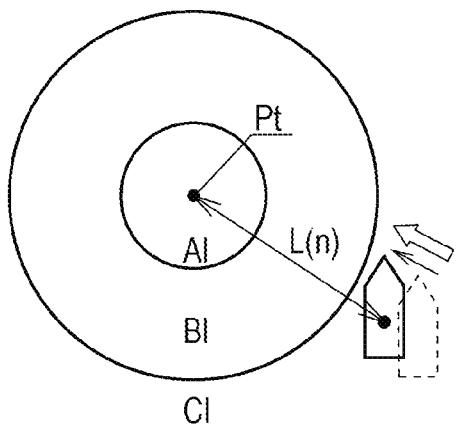
FIG. 11A is a view illustrating a movement of the ship in a movement control execution zone at the time of the movement control of the ship with the ship steering device according to the present invention.

Referring to FIG. 11A, the ship steering control device 15 of the ship steering device performs the movement control so as to reduce the distance L(n) of the ship 100 according to the PID control when the distance L(n) of the ship 100 is included in the movement control execution zone C1 (see the white arrow in FIG. 11A.

The buffer zone B1 refers to a range of distance in which the movement control to move the ship 100 by the propulsion apparatus such as the forward-backward propellers 4 or the side thruster 6 is switched between an execution state and a suspension state corresponding to the operation state at the time when the distance L(n) of the ship 100 is included in the buffer zone B1.

Figures 1, 11B:
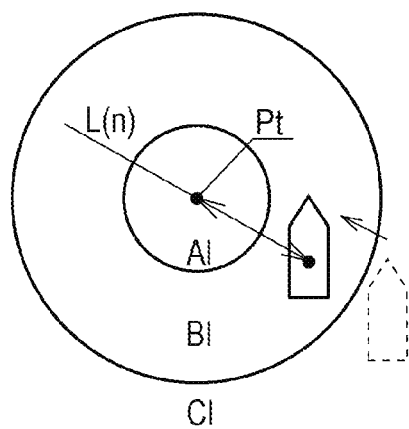
Figures 2, 11B:
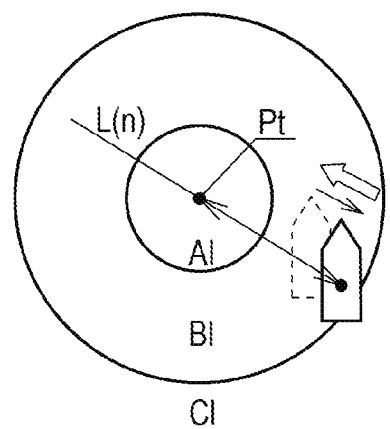

Referring to FIG. 11B-1, the ship steering control device 15 of the ship steering device does not perform the movement control regardless of the distance L(n) when the ship 100 is turning in a direction in which the distance L(n) is reduced in the case where the ship 100 moves from a state in which the distance L(n) is included in the movement control suspension zone A1 to a state in which the distance L(n) is included in the buffer zone B1 (see the arrow in FIG. 11B-1 and the distance L(n) is still included in the buffer zone B1.

On the other hand, the ship steering control device 15 of the ship steering device performs the movement control so as to reduce the distance L(n) (see the white arrow in FIG. 11B-2) when the ship 100 is moving in a direction in which the distance L(n) is increased (see the arrow in FIG. 11B-2

Figure 11C:
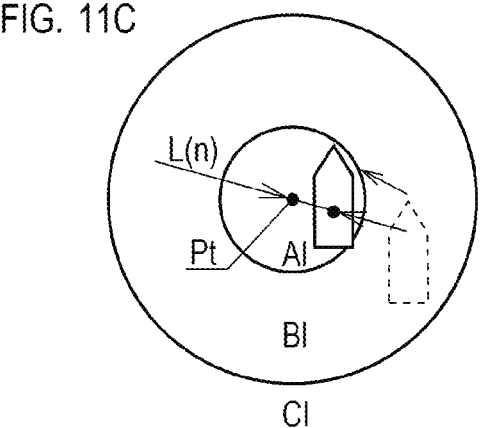
FIG. 11C is a view illustrating a movement of the ship in a movement control suspension zone at the time of the movement control.

Referring to FIG. 11C, the ship steering control device 15 of the ship steering device does not perform the movement control regardless of the moving direction and the distance L(n) when the ship 100 is moving between a state in which the distance L(n) is included in the buffer zone B1 and a state in which the distance L(n) is included in the movement control suspension zone A1.

The movement control suspension zone Al refers to a range of distance in which the movement control to move the ship 100 by the propulsion apparatuses such as the forward-backward propellers 4 and the side thruster 6 is not performed. The ship steering control device 15 of the ship steering device does not perform the turning control regardless of the turning angle R(n) of the ship 100 when the distance L(n) of the ship 100 is included in the movement control suspension zone A1.

In other words, the movement control is suspended when the ship 100 is moving toward the target coordinates Pt and included in an area determined by the movement control suspension zone A1 or an area determined by the buffer zone B1, when the ship 100 is moving away from the target coordinates Pt and included in the area determined by the movement control suspension zone A1, and when the ship 100 is moving away from the target coordinates Pt and enters the area determined by the buffer zone B1 from the area determined by the movement control suspension zone A1.

Next, the state of the dead zone control at the time of the movement control by the ship steering device 7 according to the present invention is described in detail below. Note that the ship steering control device 15 has calculated the target coordinates Pt of latitude Lat and longitude Lot which are the target position coordinates of the ship 100 based on a signal corresponding to the operation direction and the operation amount acquired by the joystick lever 10.

Figure 12:
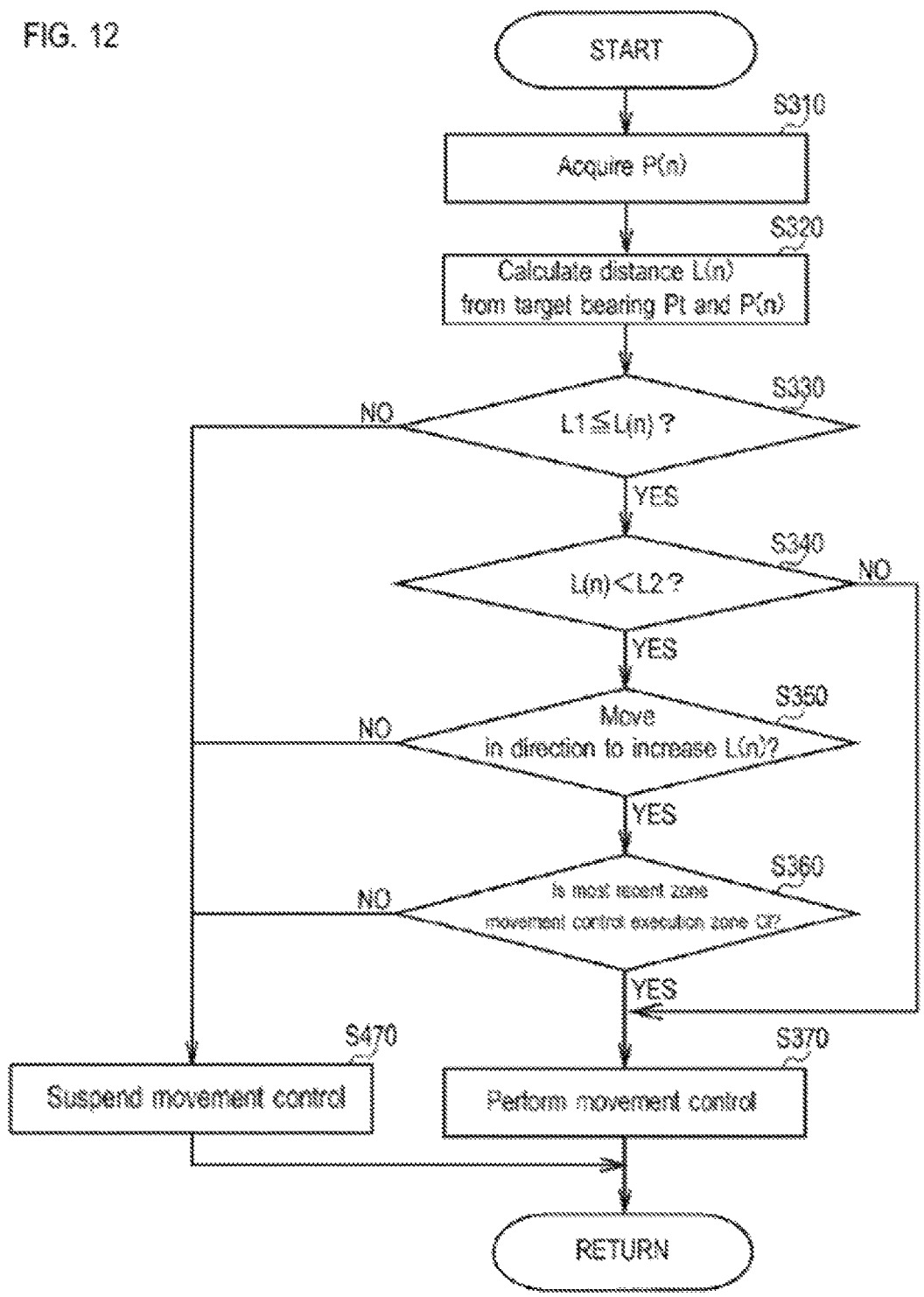
FIG. 12 is a flowchart of a dead zone control in the movement control of the ship with the ship steering device according to the present invention.

Referring to FIG. 12, the ship steering control device 15 acquires the present coordinates P(n) of the ship 100 from the GPS device 13 in step S310, and proceeds to the process of step S320.

In step S320, the ship steering control device 15 calculates the distance L(n) from the target coordinates Pt calculated in advance and the acquired present coordinates P(n), and proceeds to the process of step S330.

In step S330, the ship steering control device 15 determines whether or not the calculated distance L(n) is equal to or greater than the distance L1.

As a result, when the calculated distance L(n) is determined to be equal to or greater than the distance L1, i.e., when the present coordinates P(n) is determined to not be included in the movement control suspension zone A1, the ship steering control device 15 proceeds to the process of the step S340.

On the other hand, when the calculated distance L(n) is determined to be not equal to or greater than the distance L1, i.e., when the present coordinates P(n) is determined to be included in the movement control suspension zone A1, the ship steering control device 15 proceeds to the process of step S470.

In step S340, the ship steering control device 15 determines whether or not the calculated distance L(n) is less than the distance L2.

As a result, when the calculated distance L(n) is determined to be less than the distance L2, i.e., when the present coordinates P(n) is determined to be included in the buffer zone Br, the ship steering control device 15 proceeds to step S350.

On the other hand, when the calculated distance L(n) is determined to not be less than the distance L2, i.e., when the present coordinates P(n) is determined to not be included in the buffer zone Br, the ship steering control device 15 proceeds to the process of step S370.

In step S350, the ship steering control device 15 determines whether or not the calculated distance L(n) is greater than the distance L(n−1) calculated before the unit time. In other words, the ship steering control device 15 determines whether or not the ship 100 is moving away from the target coordinates Pt.

As a result, when the calculated distance L(n) is determined to be larger than the distance L(n−1) calculated before the unit time, i.e., when the ship 100 is determined to be moving away from the target coordinates Pt, the ship steering control device 15 proceeds to the process of step S360.

On the other hand, when the calculated distance L(n) is determined to be equal to or less than the distance L(n−1) calculated before the unit time, i.e., when the ship 100 is determined to not be moving away from the target coordinates Pt, the ship steering control device 15 proceeds to the process of step S470.

In step S360, the ship steering control device 15 determines whether or not the calculated distance L(n) is most recently included in the movement control execution zone C1.

As a result, when the calculated distance L(n) is determined to be most recently included in the movement control execution zone C1, the ship steering control device 15 proceeds to the process of step S370.

On the other hand, when the calculated distance L(n) is determined to not be most recently included in the movement control execution zone C1, the ship steering control device 15 proceeds to the process of step S470.

In step S370, the ship steering control device 15 performs the movement control, and returns to the process of step S310.

In step S470, the ship steering control device 15 suspends the movement control, and returns to the process of step S310.

Since the zones are set as described above, the control mode is shifted according to the way of the ship 100 and existence of the influence of the disturbances such as water current or wind. Accordingly, the positioning control corresponding to an inertial force of the ship or the influence of the disturbances is performed, and thus the ship 100 is prevented from being held on the boundary of the dead zone and reaches the vicinity of the target bearing At and the target coordinates Pt. Note that the range of angles of the buffer zone Br, the range of distance of the buffer zone B1, the thrust at the time of the turning control, and the thrust at the time of the movement control may be changed corresponding to the shape of the hull or behavior of the ship 100. For example, the buffer zone may be set to be small when data of the GPS device 13 or the heading sensor 14 indicate that the ship is apt to stop in the vicinity of the turning control suspension zone Ar or the movement control suspension zone A1.

The description now turns to a turning correction control of the ship steering device according to the present invention to correct a deviation of the moving direction caused by making a turn in the positioning control, with reference to FIGS. 13A, 13B, 14A, and 14B.

The deviation of the moving direction caused by making a turn in the positioning control refers to a deviation of the moving direction θ(n) in the movement control of the ship 100 that is caused by the turning control when the movement control of the ship 100 and the turning control of the ship 100 are simultaneously performed.

First, a control mode in which the turning correction control of the deviation of the moving direction caused by making a turn is not performed, is described below with reference to FIGS. 13A and 13B. In this embodiment, the movement control is performed to move the ship 100 from the present coordinates P(n) to the target coordinates Pt in the moving direction θ(n), and the turning control is performed to turn the bow from the present bearing Az(n) by 180 degrees to the target bearing At.

Figure 13A:
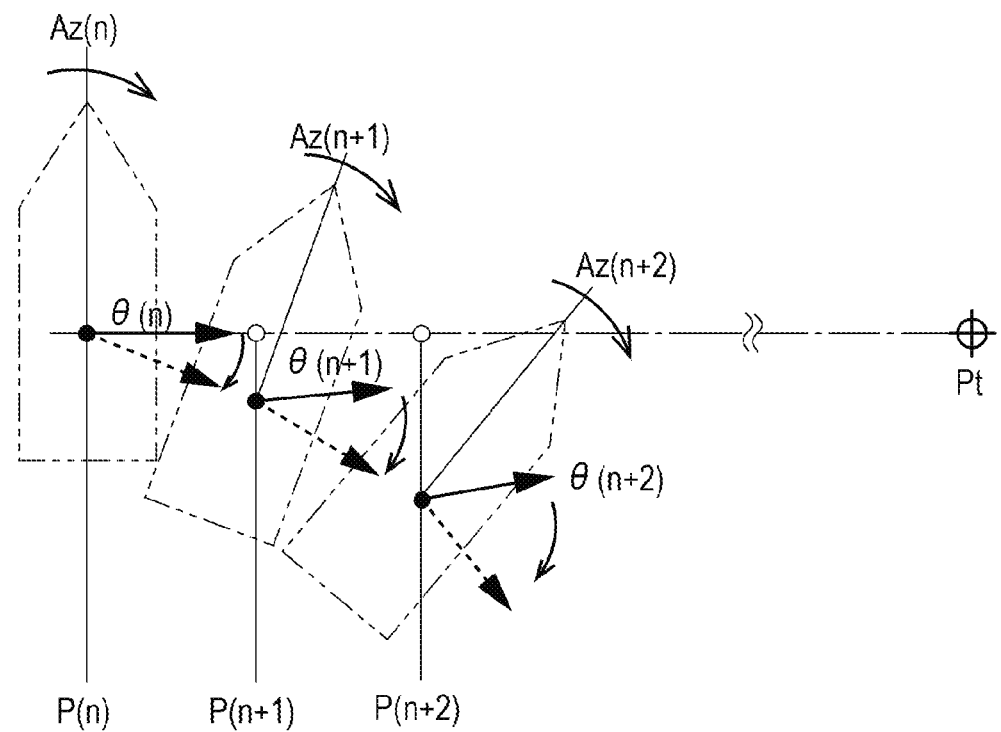
FIG. 13A is a view illustrating a movement of the ship with the ship steering device according to the present invention in the movement control and the turning control.

Referring to FIG. 13A, when acquiring the present coordinates P(n), the ship steering control device 15 performs the movement control to move the ship 100 in the moving direction θ(n) from the present coordinates P(n) to the present coordinates P(n+1), and performs the turning control to turn the ship 100 from the present bearing Az(n) to the present bearing Az(n+1). At this time, the ship 100 is affected by the turning control and the moving direction θ(n) at the present coordinates P(n) (see the black arrow in FIG. 13A is deviated from the direction of the target coordinates Pt (see the black dashed arrow in FIG. 13A. Accordingly, the ship 100 is moved by the movement control in a direction deviated from the direction linearly connecting the present coordinates P(n) and the target coordinates Pt.

Further, when acquiring the present coordinates P(n+1), the ship steering control device 15 performs the movement control to move the ship 100 from the present coordinates P(n+1) to the present coordinates P(n+2) in a moving direction θ(n+1) in which the deviation is corrected, and also performs the turning control to turn the ship 100 from the present bearing Az(n+1) to the present bearing Az(n+2). At this time, the ship 100 is affected by the turning control, and the moving direction θ(n+1) at the present coordinates P(n+1) (see the black dashed arrow in FIG. 13A is deviated from the direction of the target coordinates Pt.

Figure 13B:
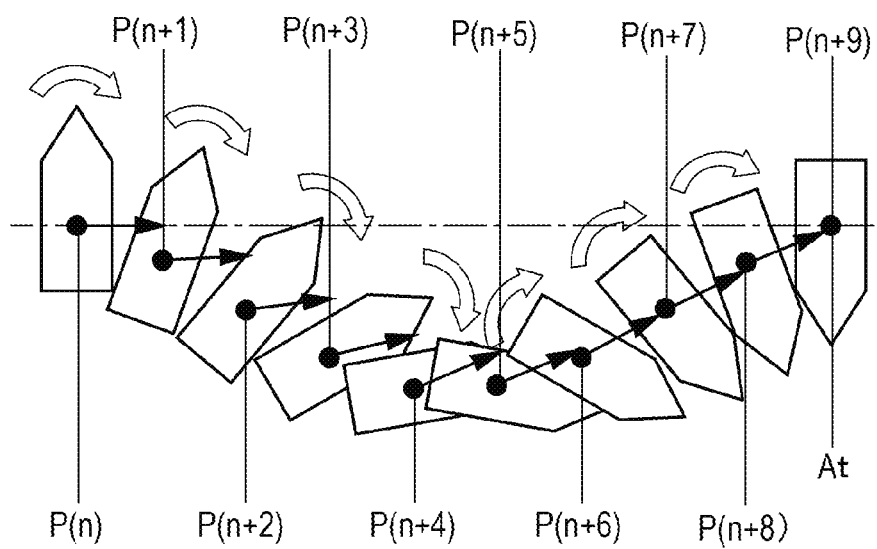
FIG. 13B is a view illustrating a path of the ship from the present coordinates to the target coordinates.

As a result, referring to FIG. 13B, the ship steering control device 15 cannot control the ship 100 to move in a straight line connecting the present coordinates P(n) and the target coordinates Pt, since the path of the ship bulges in the turning direction due to the deviation of the moving direction θ(n) caused by the turning control.

Next, a control mode in which the turning correction control is performed to correct the deviation of the moving direction caused by making a turn is described below with reference to FIGS. 14A and 14B.

Figure 14A:
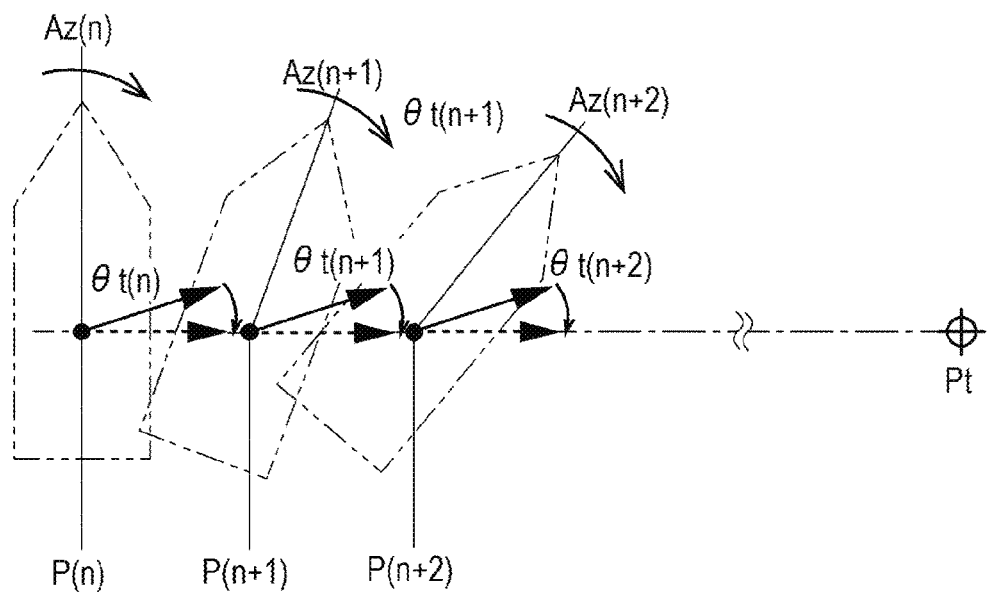
FIG. 14A is a view illustrating a movement of the ship with the ship steering device according to the present invention to which a turning correction control is applied in the movement control and the turning control of the ship.

Referring to FIG. 14A, when acquiring the present coordinates P(n), the ship steering control device 15 performs the movement control to move the ship 100 in the moving direction θ(n) from the present coordinates P(n) to the present coordinates P(n+1), and also performs the turning control to turn the ship 100 from the present bearing Az(n) to the present bearing Az(n+1). At this time, the ship 100 is affected by the turning control and the moving direction θ(n) at the present coordinates P(n) is about to deviate from the direction of the target coordinates Pt due to the effect of the turning control (see the black dashed arrow in FIG. 13A. Then, the ship steering control device 15 moves the ship 100 in the target moving direction θt(n) in consideration of the present bearing Az(n+1) at the time when the ship 100 moves to the present bearing Az(n+1) by the turning correction control.

Figure 14B:
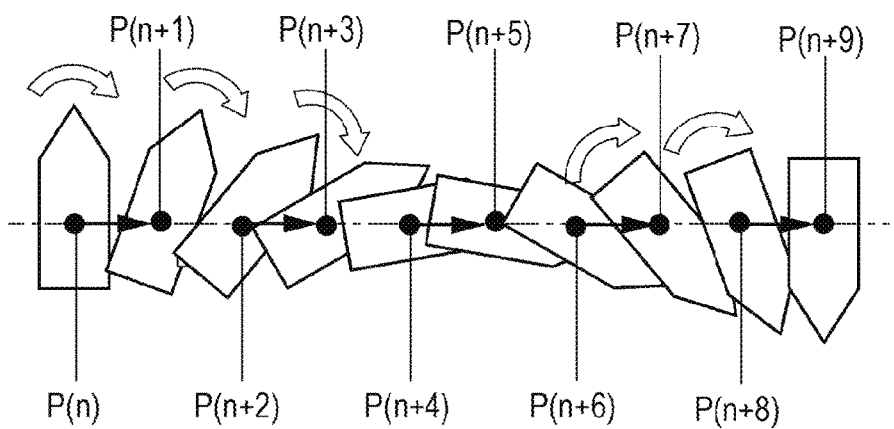
FIG. 14B is a view illustrating a path from the present coordinates to the target coordinates of the ship to which the turning correction control is applied in the movement control and the turning control.

As a result, referring to FIG. 14B, the ship steering control device 15 corrects the deviation of the moving direction θ(n) caused by the turning control and controls the ship 100 to move in a substantially straight line connecting the present coordinates P(n) and the target coordinates Pt.

With this configuration, the turning correction control is performed to correct the moving direction θ(n) in the movement control to the target moving direction θt(n) in consideration of the effect of the turning control, thereby enabling the ship 100 to move in a substantially straight line from the present coordinates P(n) to the target coordinates Pt. This enables a reduction in an area required for moving and turning the ship even when the movement control and the turning control are simultaneously performed. In addition, the ship steering control device 15 performs the above described dead zone control when the ship reaches within a predetermined range around the target coordinates or reaches within a predetermined bearing (angle) around the target bearing. This enables the ship 100 to remain in a predetermined range around the target coordinates and also remain in a predetermined bearing (angle) around the target bearing after the completion of the turning correction control.

The description now turns to a setting mode of the target coordinates Pt and the target bearing At using the joystick lever 10 in the positioning control in the ship steering device according to the present invention, with reference to FIGS. 15A to 15C, and 16.

Figure 15A:
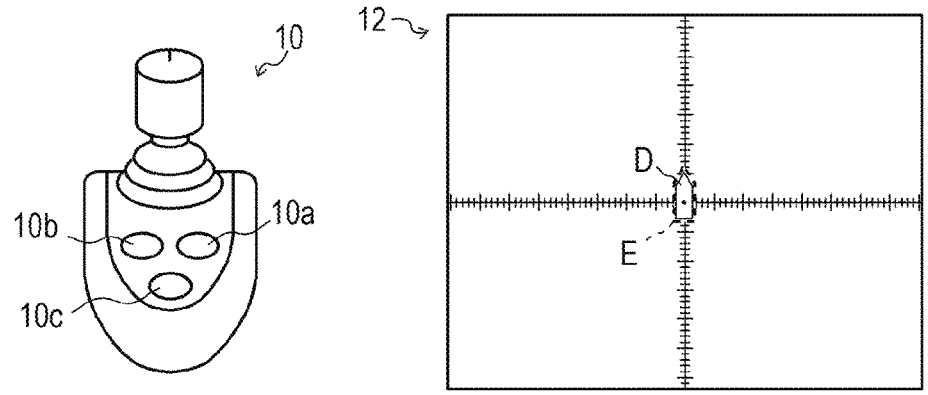
FIG. 15A is a view illustrating a state of a joystick lever 10 and a monitor at the time of starting a positioning control of the ship with the ship steering device according to the present invention.
Figure 15B:
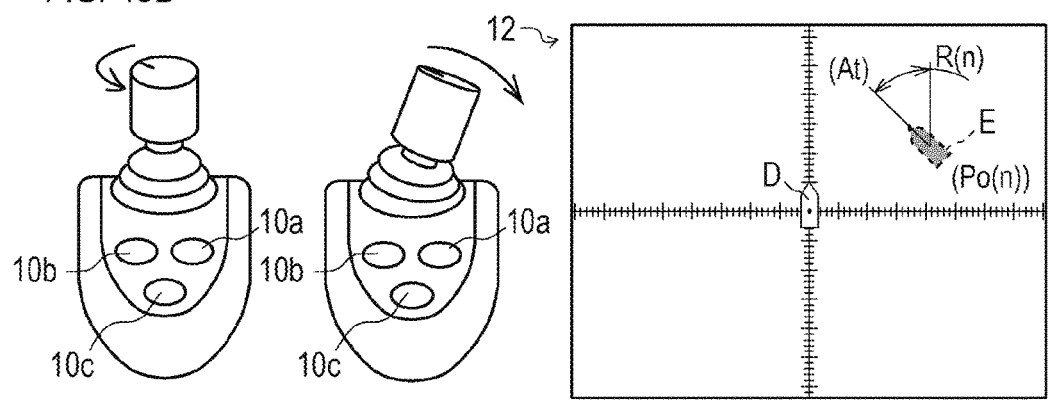
FIG. 15B is a view illustrating a state of the joystick lever and the monitor at the time of setting the target coordinates and the target bearing of the ship with the ship steering device.
Figure 15C:
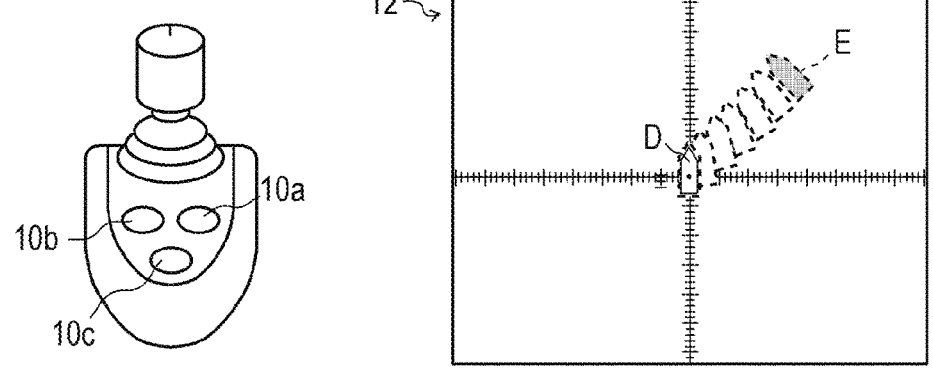
FIG. 15C is a view illustrating a state of the joystick lever and the monitor at the time of the turning control and the movement control of the ship with the ship steering device.

Referring to FIGS. 15A to 15C, the ship steering device is configured to set the target coordinates Pt and the target bearing At by using the joystick lever 10 and Figures D and E each of which has a shape of the ship 100 and is displayed on the monitor 12 when the ship steering control device 15 performs the positioning control. The ship steering control device 15 is configured to display Figure D at the center of the monitor 12 of the ship steering device in such a manner that the orientation of Figure D coincides with the orientation of the bow of the ship 100, and indicate the target coordinates Pt and the target bearing At of the ship 100 with Figure E.

Referring to FIG. 15A, when receiving a signal from the positioning switch 10a of the joystick lever 10, the ship steering control device 15 starts the positioning control. When receiving the signal from the positioning switch 10a, the ship steering control device 15 sets the position and the direction of Figure D so as to indicate the present coordinates P(n) and the present bearing Az(n) of the ship 100. At the same time, the ship steering control device 15 displays Figure E, which is distinguishable from Figure D (dashed figure in the shape of a ship in this embodiment), at the same position as Figure D.

Referring to FIG. 15B, the ship steering control device 15 calculates the target coordinates Pt and the target bearing At based on the signal received from the joystick lever 10. The ship steering control device 15 calculates the target bearing At based on the rotation amount of the joystick lever 10, and calculates the target coordinates Pt based on the inclination direction and inclination amount of the joystick lever 10. The ship steering control device 15 also calculates the target coordinates Pt as the target polar coordinates Po(n) indicated by the distance L(n) from the present coordinates P(n) and the moving direction θ(n), and calculates the target bearing At as the turning angle R(n) which is a difference between the present bearing Az(n) and the present bearing Az(n). Then, the ship steering control device 15 displays Figure E at the target coordinates Pt based on the target polar coordinates Po(n) and the turning angle R around the present bearing Az(n).

When receiving a movement signal from the movement switch 10b of the joystick lever 10, the ship steering control device 15 controls the thrust of the forward-backward propellers 4, the switching state of the switching clutches 3, and the thrust and the rotation directions of the rudders 5 and the side thruster 6 to move the ship 100 toward the target coordinates Pt, and turns the ship 100 in the target bearing At. At this time, the ship steering control device 15 moves the ship 100 while performing the turning correction control to correct the deviation of the moving direction caused by the turning control. In addition, the ship steering control device 15 performs the movement control and the turning control so that the ship 100 is included in the predetermined range of the target coordinates Pt and the target bearing At while applying the above described zone control. At the same time, the ship steering control device 15 controls the ship 100 to which the zone control is applied to be held in the predetermined range of the target coordinates Pt and the target bearing At.

Referring to FIG. 15C, when the ship 100 starts to move, the ship steering control device 15 moves Figure E based on the distance L(n) from the present coordinates P(n) to the target coordinates Pt and the moving direction θ(n). In the same manner, the ship steering control device 15 turns Figure E based on the turning angle R(n) from the present bearing Az(n) to the target bearing At. In other words, the ship steering control device 15 displays Figure E so as to correspond to the movement and turning of the ship 100 with respect to Figure D. With this configuration, Figure E is displayed to approach Figure D as the ship 100 approaches the target coordinates Pt and the target bearing At. In this embodiment, the target coordinates Pt and the target bearing At are displayed by using Figure E, but the distance L(n) and the turning angle R(n) may be displayed on the monitor 12.

Next, the positioning control by using the joystick lever 10 of the ship steering device 7 according to the present invention is described in detail below. Note that the ship steering control device 15 has appropriately acquired the present coordinates P(n) from the GPS device 13 and appropriately acquired the present bearing Az(n) of the bow of the ship 100 from heading sensor 14.

Figure 16:
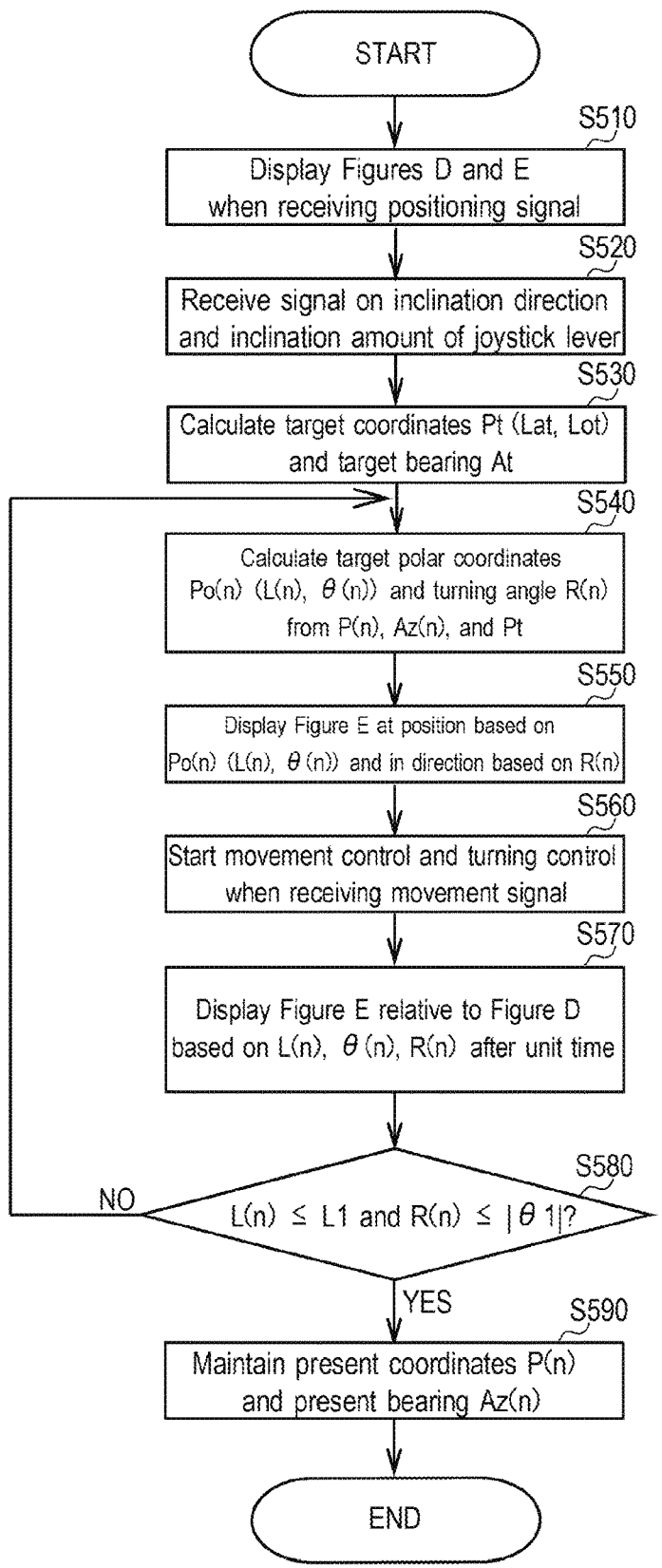
FIG. 16 is a flowchart of the positioning control of the ship with the ship steering device according to the present invention.

Referring to FIG. 16, in step S510, when receiving a positioning signal from the positioning switch 10a of the joystick lever 10, the ship steering control device 15 displays Figure D indicating the present coordinates P(n) and the present bearing Az(n) of the ship 100 at the center of the monitor 12, displays Figure E distinguishable from Figure D so as to overlap with Figure D, and proceeds to the process of step S520.

In step S520, when receiving a signal on the inclination direction and inclination amount from the joystick lever 10, the ship steering control device 15 proceeds to the process of step S530.

In step S530, the ship steering control device 15 calculates the target coordinates Pt and the target bearing At of the ship 100, and proceeds to the process of step S540.

In step S540, the ship steering control device 15 calculates the distance L(n) from the present coordinates P(n) to the target coordinates Pt and the moving direction θ(n), calculates the turning angle R(n) which is an angle from the present bearing Az(n) to the target bearing At, and proceeds to the process of step S550.

In step S550, the ship steering control device 15 displays Figure E at a position based on the calculated distance L(n), the moving direction θ(n), and the turning angle R(n), and proceeds to the process of step S560.

In step S560, when receiving a movement signal from the movement switch 10b of the joystick lever 10, the ship steering control device 15 starts the turning control and the movement control of the ship 100 while applying the dead zone control and the turning correction control, and proceeds to the process of step S570.

In step S570, the ship steering control device 15 moves Figure E based on the distance L(n), the moving direction θ(n), and the turning angle R(n) after the unit time relative to Figure D displayed on the monitor 12, and then proceeds to the process of step S580.

In step S580, the ship steering control device 15 determines whether or not the distance L(n) of the ship 100 is less than the distance L1 which is a predetermined range of the target coordinates Pt in consideration of the dead zone control, and the turning angle R(n) of the ship 100 is less than |angle θ1| which is a predetermined range of the target bearing At in consideration of the dead zone control.

As a result, when the distance L(n) of the ship 100 is determined to be less than the distance L1 which is in a predetermined range of the target coordinates Pt in consideration of the dead zone control, and the turning angle R(n) of the ship 100 is determined to be less than |angle θ1| which is in a predetermined range of the target bearing At in consideration of the dead zone control, the ship steering control device 15 proceeds to the process of step S590.

On the other hand, when the distance L(n) of the ship 100 is determined to not be less than the distance L1 which is in a predetermined range of the target coordinates Pt in consideration of the dead zone control, or the turning angle R(n) of the ship 100 is determined to not be less than |angle θ1| which is in a predetermined range of the target bearing At in consideration of the dead zone control, the ship steering control device 15 proceeds to the process of step S540.

In step S590, the ship steering control device 15 maintains the present coordinates P(n) and the present bearing Az(n), and finishes the steps.

With the above configuration, the target coordinates Pt and the target bearing At of the ship 100 is intuitively set by the operation of the joystick lever 10 based on the present coordinates P(n) and the present bearing Az(n) of the ship 100. This allows an operator to recognize a positional relationship between the present position of the ship 100 and the target position, and thus enables the positioning control of the ship 100 to be easily performed.

INDUSTRIAL APPLICABILITY

The present invention can be utilized in the field of ship steering devices.

DESCRIPTION OF REFERENCE SIGNS

7: Ship steering device
13: GPS device
L(n): Distance
A1: Movement control suspension zone
B1: Buffer zone
C1: Movement control execution zone
100: Ship

The invention claimed is:
1. A ship steering system configured to perform a movement control to move a ship to a target position, the ship steering system comprising:
 a ship steering control device coupled to an ECU, the ship steering control device configured to:
  determine, based on a distance between a present position of a ship calculated from a signal from a GPS device and a target position of the ship:
   a movement control suspension zone including the target position,
   a buffer zone adjacent to the movement control suspension zone, and
   a movement control execution zone adjacent to the buffer zone,
  suspend generation of a thrust by a propulsion apparatus of the ship based on the present position being in the movement control suspension zone,
  generate the thrust by the propulsion apparatus of the ship based on the present position being in the movement control execution zone, and generate the thrust by the propulsion apparatus of the ship based on the present position being in the buffer zone only when:
the ship moves from the movement control execution zone to the buffer zone, and
the ship is moving away from the target position.

2. The ship steering system according to claim 1, wherein a size of the buffer zone is changed according to characteristics of the ship.

3. The ship steering system according to claim 1, further comprising:
the GPS device;
a joystick lever; and
a bearing sensor.

4. The ship steering system according to claim 3, wherein the target position comprises target coordinates having a target latitude and a target longitude.

5. The ship steering system according to claim 1, wherein:
the ship steering control device further comprises a joystick lever; and
the ship steering control device is further configured to calculate target coordinates corresponding to the target position, the target coordinates calculated based on a signal corresponding to an operation direction and an operation amount of the joystick lever.

6. A system comprising:
an electronic control unit (ECU); and
a ship steering controller operationally coupled to the ECU and configured to:
determine a present bearing of a ship;
perform a first turning angle calculation to calculate a first turning angle based on the present bearing and a target bearing;
compare the first turning angle to a first angle and a second angle;
based on the first turning angle being less than the first angle, transmit a suspend turning control command;
based on the first turning angle being greater than or equal to the second angle, transmit a perform turning control command; and
based on the first turning angle being between the first angle and the second angle:
perform a second turning angle calculation to calculate a second turning angle based on the present bearing and the target bearing; and
transmit a perform turning control command only when:
the second turning angle is greater than the first turning angle; and
a stored turning angle is greater than or equal to the second angle.

7. The system of claim 6, wherein the ship steering controller comprises:
a GPS device;
a bearing sensor; and
the present bearing is determined based on the bearing sensor and the GPS device.

8. The system of claim 6, further comprising:
an engine configured to power a forward-backward propeller via a propeller shaft;
a side thruster; and
a joystick lever.

9. The system of claim 8, wherein:
the first angle corresponds to a boundary between a control suspension zone and a buffer zone;
the second angle corresponds to a boundary between the buffer zone and a control execution zone; and
the stored turning angle immediately preceded the first turning angle by a unit time.

10. The system of claim 9, further comprising:
a turning control configured to turn the ship via the forward-backward propeller and the side thruster; and
wherein the buffer zone comprises a range of angles between the first and second angle in which the turning control is switched between an execution state and a suspension state corresponding to an operation state based on a turning angle of the ship being included in the buffer zone.

11. The system of claim 9, wherein the ship steering controller is further configured to:
detect an operation direction and an operation amount of the joystick lever; and
calculate the target bearing based on a signal corresponding to the operation direction and the operation amount of the joystick lever.

12. The system according to claim 9, wherein a size of the buffer zone is changed according to characteristics of the ship.

13. A computer readable storage device comprising instructions, that when executed by a processor, cause the processor to:
calculate a first distance between a first position of a ship and a target position;
calculate a second distance between a second position of the ship and the target position
based on the second distance, generate one or more movement control zones comprising:
a movement control suspension zone between the target position and a first predetermined distance;
a buffer zone between the first predetermined distance and a second predetermined distance; and
a movement control execution zone adjacent to the buffer zone;
based on the second distance being less than the first predetermined distance, generate a suspend movement command;
based on the second distance being greater than or equal to the second predetermined distance, generate a perform movement command; and
based on the second distance being between the first predetermined distance and the second predetermined distance, generate the suspend movement command, unless:
the second distance is greater than a third distance; and
the first distance is greater than or equal to the second predetermined distance.

14. The computer readable storage device of claim 13, wherein the processor is further configured to:
receive a third position of the ship; and
calculate the third distance between the third position of the ship and the target position.

15. The computer readable storage device of claim 13, wherein
the movement control execution zone circumscribes the buffer zone;
the buffer zone circumscribes the movement control suspension zone; and
the movement control suspension zone circumscribes the target position.

16. The computer readable storage device of claim 13, wherein the ship comprise a propulsion apparatus comprises one or more forward-backward propellers and a side thruster.

* * * * *